United States Patent
Ho et al.

(10) Patent No.: US 6,926,830 B2
(45) Date of Patent: Aug. 9, 2005

(54) COMBINED ACTIVATED SLUDGE-BIOFILM SEQUENCING BATCH REACTOR AND PROCESS

(75) Inventors: Kin Man Ho, Kowloon (HK); Paul F. Greenfield, Indooroopilly (AU); W. Wesley Eckenfelder, Jr., Nashville, TN (US)

(73) Assignee: Kingsford Environmental (H.K.) Ltd., Kowloon (HK)

( * ) Notice: Subject to any disclaimer, the term of this patent is extended or adjusted under 35 U.S.C. 154(b) by 0 days.

(21) Appl. No.: 10/609,002

(22) Filed: Jun. 27, 2003

(65) Prior Publication Data

US 2004/0206699 A1 Oct. 21, 2004

Related U.S. Application Data

(60) Provisional application No. 60/393,043, filed on Jun. 28, 2002.

(51) Int. Cl.[7] .............................. C02F 3/30; C02F 3/06
(52) U.S. Cl. ..................... 210/605; 210/615; 210/629; 210/630; 210/150; 210/259; 210/903; 210/906
(58) Field of Search ................................ 210/605, 629, 210/615–617, 630, 903, 906, 908, 150, 151, 252, 259

(56) References Cited

U.S. PATENT DOCUMENTS

| | | | |
|---|---|---|---|
| 2,458,163 A | * | 1/1949 | Hays .......................... 210/605 |
| 4,500,429 A | * | 2/1985 | Reimann et al. ............. 210/616 |
| 4,620,929 A | * | 11/1986 | Hofmann ...................... 210/610 |
| 4,623,464 A | | 11/1986 | Ying et al. .................... 210/616 |
| 5,228,996 A | | 7/1993 | Lansdell ...................... 210/605 |
| 5,354,471 A | | 10/1994 | Timpany et al. ............. 210/607 |
| 5,525,231 A | | 6/1996 | Ho et al. ...................... 210/620 |
| 5,667,688 A | * | 9/1997 | Kerrn-Jespersen et al. .. 210/605 |
| 6,328,892 B1 | * | 12/2001 | Jones ........................... 210/605 |
| 6,444,126 B1 | * | 9/2002 | Gates et al. .................. 210/612 |
| 2002/0030003 A1 | | 3/2002 | O'Leary et al. .............. 210/151 |

FOREIGN PATENT DOCUMENTS

| | | |
|---|---|---|
| CN | 1115178 A | 1/1996 |
| DE | 3826519 A1 * | 8/1990 |
| WO | WO 95/24361 | 9/1995 |
| WO | WO 99/47459 A1 * | 9/1999 |

* cited by examiner

Primary Examiner—Fred G. Prince
(74) Attorney, Agent, or Firm—Fish & Richardson P.C.

(57) ABSTRACT

A new biofilm-activated sludge Sequencing Batch Reactor (SBR) treatment process for sewage or wastewater has successfully been developed as the third generation SBR (SBR3). This new SBR3 process utilizes a multi-stage and multi-sludge SBR configuration receiving either continuous or intermittent inflow of wastewater. Each stage has individually controlled continuous or alternating anaerobic/anoxic/aerobic operation, with or without mixing and recycling from the other stage(s). The configuration and operation is dependent upon the treatment objectives and effluent discharge requirements. In the preferred embodiment, carriers are used to facilitate control of operating conditions.

29 Claims, 23 Drawing Sheets

| Period | pH | TCOD | SCOD | TSS | VSS | TKN | NH$_4$-N | TCOD:TKN |
|---|---|---|---|---|---|---|---|---|
| 1 | 7.81 | 389 | 195 | 220 | 142 | 43 | 26 | 9.1 |
| 2 | 7.85 | 354 | 176 | 189 | 135 | 41 | 29 | 8.6 |
| 3 | 7.76 | 363 | 183 | 212 | 132 | 43 | 30 | 8.4 |
| 4 | 7.70 | 338 | 140 | 227 | 146 | 36 | 26 | 9.4 |
| 5 | 7.75 | 321 | 156 | 232 | 157 | 37 | 28 | 8.7 |
| 6 | 7.71 | 332 | 170 | 243 | 169 | 37 | 24 | 9.0 |
| 7 | 7.75 | 436 | 156 | 256 | 178 | 45 | 31 | 9.7 |
| 8 | 7.77 | 324 | 148 | 232 | 143 | 39 | 25 | 8.3 |
| 9 | 7.86 | 364 | 167 | 228 | 155 | 40 | 27 | 9.1 |
| 10 | 7.92 | 341 | 162 | 213 | 135 | 41 | 27 | 8.3 |
| 11 | 7.73 | 367 | 226 | 187 | 113 | 42 | 26 | 8.7 |
| 12 | 8.02 | 379 | 179 | 233 | 156 | 39 | 28 | 9.7 |
| 13 | 7.93 | 385 | 156 | 227 | 149 | 43 | 29 | 9.0 |
| 14 | 7.89 | 381 | 174 | 262 | 169 | 41 | 31 | 9.3 |
| 15 | 7.75 | 406 | 181 | 253 | 173 | 45 | 30 | 9.0 |
| 16 | 7.68 | 382 | 184 | 237 | 156 | 39 | 27 | 9.8 |
| 17 | 7.44 | 393 | 172 | 243 | 163 | 38 | 31 | 10.3 |
| 18 | 7.77 | 411 | 169 | 261 | 177 | 44 | 28 | 9.3 |
| 19 | 7.63 | 379 | 183 | 224 | 136 | 43 | 32 | 8.8 |
| 20 | 7.65 | 397 | 167 | 264 | 159 | 42 | 33 | 9.5 |
| 21 | 7.83 | 387 | 183 | 244 | 152 | 39 | 29 | 9.9 |
| 22 | 7.56 | 372 | 186 | 226 | 141 | 42 | 31 | 8.9 |
| 23 | 7.76 | 417 | 178 | 268 | 187 | 41 | 29 | 10.2 |
| 24 | 7.79 | 395 | 193 | 237 | 144 | 40 | 29 | 9.9 |
| 25 | 7.82 | 364 | 191 | 206 | 125 | 38 | 27 | 9.6 |

Fig. 8C

| Phase | Period | SBR3 | | | | | | | | | |
|---|---|---|---|---|---|---|---|---|---|---|---|
| | | TCOD | SCOD | TSS | VSS | TKN | NH₄-N | NO₃-N | MLSS | MLVSS |
| I | 1 | 95 | 80 | 10 | 7 | 8.3 | 4.4 | 10.2 | 3430 | 2400 |
| | 2 | 93 | 80 | 9 | 6 | 7.9 | 4.4 | 9.6 | 3350 | 2520 |
| | 3 | 83 | 72 | 8 | 5 | 6.0 | 3.7 | 8.8 | 3560 | 2360 |
| | 4 | 78 | 68 | 7 | 5 | 6.0 | 3.0 | 7.2 | 3450 | 2480 |
| | 5 | 73 | 61 | 8 | 5 | 5.5 | 2.1 | 4.3 | 3530 | 2450 |
| | 6 | 75 | 61 | 7 | 5 | 5.2 | 1.5 | 4.6 | 3420 | 2320 |
| | 7 | 72 | 58 | 9 | 6 | 4.5 | 1.7 | 4.6 | 3680 | 2540 |
| | 8 | 70 | 54 | 6 | 4 | 4.2 | 1.2 | 5.4 | 3570 | 2570 |
| | 9 | 76 | 57 | 7 | 5 | 4.6 | 1.6 | 5.6 | 3250 | 2270 |
| II(a) | 10 | 74 | 64 | 8 | 5 | 5.8 | 2.4 | 6.4 | 2310 | 1550 |
| | 11 | 96 | 78 | 12 | 8 | 6.2 | 2.8 | 8.0 | 1450 | 1000 |
| | 12 | 94 | 82 | 8 | 5 | 7.2 | 2.8 | 8.4 | 1420 | 970 |
| II(b) | 13 | 89 | 79 | 7 | 5 | 5.4 | 2.4 | 8.8 | 1350 | 890 |
| | 14 | 85 | 77 | 6 | 4 | 6.2 | 2.9 | 7.9 | 1290 | 810 |
| | 15 | 85 | 73 | 8 | 5 | 6.7 | 3.1 | 7.9 | 1330 | 860 |
| II(c) | 16 | 84 | 69 | 9 | 6 | 6.2 | 2.2 | 7.8 | 1360 | 890 |
| | 17 | 95 | 79 | 11 | 7 | 5.0 | 2.0 | 8.3 | 1410 | 900 |
| | 18 | 90 | 72 | 13 | 9 | 5.4 | 2.1 | 8.8 | 1350 | 920 |
| II(d) | 19 | 83 | 72 | 7 | 5 | 4.8 | 1.8 | 8.0 | 1370 | 840 |
| | 20 | 84 | 69 | 8 | 5 | 5.5 | 2.0 | 9.2 | 1400 | 920 |
| | 21 | 94 | 74 | 12 | 8 | 5.9 | 2.1 | 8.4 | 1380 | 950 |
| | 22 | 87 | 71 | 9 | 6 | 6.0 | 2.2 | 8.5 | 1340 | 910 |
| II(e) | 23 | 94 | 73 | 12 | 8 | 6.4 | 2.3 | 7.2 | 1370 | 880 |
| | 24 | 88 | 74 | 9 | 6 | 5.3 | 2.3 | 8.6 | 1420 | 850 |
| | 25 | 86 | 75 | 7 | 5 | 5.2 | 2.2 | 8.3 | 1280 | 900 |

Fig. 8D

| Phase | Period | TCOD | SCOD | TSS | VSS | TKN | NH$_4$-N | NO$_3$-N | MLSS | MLVSS |
|---|---|---|---|---|---|---|---|---|---|---|
| | | | | | | Conventional SBR | | | | |
| I | 1 | 94 | 80 | 9 | 6 | 8.3 | 4.7 | 10.0 | 3550 | 2480 |
| | 2 | 95 | 82 | 11 | 7 | 7.8 | 4.6 | 9.9 | 3650 | 2445.5 |
| | 3 | 88 | 78 | 7 | 5 | 8.6 | 4.8 | 9.9 | 3620 | 2470 |
| | 4 | 90 | 79 | 6 | 4 | 8.3 | 5.3 | 9.6 | 3550 | 2670 |
| | 5 | 95 | 77 | 9 | 6 | 9.0 | 5.3 | 9.9 | 3670 | 2610 |
| | 6 | 84 | 78 | 7 | 5 | 8.7 | 5.2 | 10.1 | 3480 | 2540 |
| | 7 | 91 | 76 | 10 | 7 | 9.1 | 5.8 | 10.0 | 3890 | 2740 |
| | 8 | 90 | 78 | 8 | 5 | 9.3 | 6.1 | 9.6 | 3720 | 2610 |
| | 9 | 85 | 76 | 6 | 4 | 8.5 | 4.7 | 9.4 | 3450 | 2450 |
| II(a) | 10 | 102 | 87 | 9 | 6 | 10.8 | 7.3 | 8.0 | 2200 | 1350 |
| | 11 | 125 | 103 | 12 | 8 | 20.2 | 16.7 | 4.4 | 1520 | 990 |
| | 12 | 127 | 107 | 11 | 7 | 22.5 | 18.7 | 4.5 | 1550 | 1020 |
| | 13 | 123 | 109 | 7 | 5 | 23.8 | 20.2 | 4.3 | 1480 | 960 |

Fig. 8E

| Period | pH | TCOD | SCOD | TSS | VSS | TKN | NH4-N | TP | PO4-P | TCOD:TKN |
|---|---|---|---|---|---|---|---|---|---|---|
| 1 | 6.84 | 478 | 258 | 220 | 181 | 39 | 25 | 11.1 | 7.8 | 12.3 |
| 2 | 6.80 | 454 | 239 | 223 | 174 | 42 | 27 | 11.6 | 8.2 | 10.8 |
| 3 | 7.35 | 465 | 246 | 219 | 171 | 40 | 26 | 10.9 | 8.5 | 11.6 |
| 4 | 7.76 | 442 | 203 | 232 | 185 | 38 | 28 | 10.7 | 8.3 | 11.6 |
| 5 | 7.70 | 435 | 219 | 231 | 196 | 37 | 26 | 11.5 | 6.7 | 11.8 |
| 6 | 6.94 | 432 | 233 | 243 | 208 | 39 | 24 | 10.0 | 7.6 | 11.1 |
| 7 | 7.20 | 452 | 219 | 256 | 217 | 43 | 29 | 10.8 | 7.2 | 10.5 |
| 8 | 7.08 | 434 | 211 | 232 | 182 | 37 | 23 | 10.7 | 6.9 | 11.7 |
| 9 | 7.05 | 446 | 189 | 228 | 194 | 42 | 25 | 11.4 | 7.7 | 10.6 |
| 10 | 7.05 | 442 | 225 | 213 | 174 | 43 | 26 | 9.7 | 7.1 | 10.3 |
| 11 | 7.15 | 467 | 289 | 194 | 152 | 42 | 27 | 10.2 | 7.9 | 11.1 |
| 12 | 7.11 | 482 | 242 | 231 | 195 | 45 | 28 | 10.5 | 7.6 | 10.7 |
| 13 | 7.30 | 487 | 219 | 237 | 188 | 44 | 29 | 10.2 | 7.4 | 11.1 |
| 14 | 7.45 | 481 | 237 | 267 | 208 | 46 | 31 | 11.3 | 7.3 | 10.5 |
| 15 | 7.15 | 432 | 244 | 256 | 212 | 41 | 37 | 11.0 | 6.9 | 10.5 |
| 16 | 7.28 | 478 | 247 | 273 | 195 | 39 | 25 | 11.3 | 8.0 | 12.3 |
| 17 | 7.34 | 425 | 235 | 245 | 202 | 36 | 31 | 9.7 | 7.5 | 11.8 |
| 18 | 7.32 | 454 | 232 | 276 | 216 | 44 | 25 | 10.3 | 7.6 | 10.3 |

Fig. 8F

SBR3

| Phase | Period | TCOD | SCOD | TSS | VSS | TKN | NH₄-N | NO₃-N | PO₄-P | TP | MLSS | MLVSS |
|---|---|---|---|---|---|---|---|---|---|---|---|---|
| I | 1 | 69 | 48 | 17 | 10 | 3.6 | 1.6 | 4.7 | 7.0 | 7.7 | 3575 | 2400 |
| | 2 | 67 | 47 | 19 | 13 | 2.1 | 1.3 | 5.2 | 6.3 | 7.2 | 3450 | 2450 |
| | 3 | 61 | 43 | 18 | 12 | 2.3 | 0.6 | 4.8 | 6.0 | 6.5 | 3360 | 2350 |
| | 4 | 54 | 37 | 21 | 14 | 1.5 | 0.6 | 4.4 | 5.9 | 6.9 | 3440 | 2440 |
| | 5 | 46 | 32 | 20 | 15 | 1.9 | 1.1 | 4.2 | 5.8 | 6.7 | 3350 | 2510 |
| | 6 | 42 | 30 | 15 | 11 | 1.6 | 0.8 | 4.0 | 5.6 | 6.4 | 3380 | 2480 |
| II | 7 | 45 | 32 | 14 | 10 | 2.3 | 1.5 | 4.6 | 5.5 | 6.3 | 2530 | 1780 |
| | 8 | 51 | 36 | 16 | 11 | 3.6 | 2.0 | 5.4 | 5.0 | 6.0 | 1800 | 1290 |
| | 9 | 57 | 38 | 21 | 17 | 3.0 | 1.6 | 5.6 | 4.5 | 5.2 | 1840 | 1270 |
| III(a) | 10 | 54 | 36 | 17 | 11 | 3.2 | 1.6 | 5.0 | 4.4 | 5.3 | 1810 | 1350 |
| | 11 | 52 | 38 | 19 | 12 | 3.5 | 2.0 | 5.6 | 2.8 | 3.7 | 1750 | 1300 |
| | 12 | 46 | 32 | 16 | 12 | 3.4 | 1.8 | 5.8 | 1.6 | 2.4 | 1820 | 1370 |
| | 13 | 53 | 38 | 19 | 13 | 3.1 | 1.5 | 3.4 | 1.0 | 2.0 | 1850 | 1390 |
| III(b) | 14 | 54 | 37 | 19 | 12 | 3.2 | 1.8 | 5.7 | 1.7 | 2.4 | 1890 | 1280 |
| | 15 | 53 | 36 | 22 | 15 | 3.4 | 2.1 | 5.7 | 1.8 | 2.3 | 1830 | 1360 |
| III(c) | 16 | 50 | 35 | 21 | 14 | 3.6 | 2.2 | 5.0 | 1.8 | 2.5 | 1660 | 1200 |
| III(d) | 17 | 56 | 39 | 13 | 12 | 3.5 | 2.0 | 4.9 | 1.6 | 2.9 | 1810 | 1300 |
| III(e) | 18 | 49 | 33 | 21 | 14 | 3.7 | 2.1 | 5.4 | 1.8 | 2.8 | 1750 | 1320 |

Fig. 8G

| Phase | Period | TCOD | SCOD | TSS | VSS | TKN | NH$_4$-N | NO$_3$-N | PO$_4$-P | TP | MLSS | MLVSS |
|---|---|---|---|---|---|---|---|---|---|---|---|---|
| | | | | | | Conventional SBR | | | | | | |
| I | 1 | 87 | 64 | 16 | 12 | 3.8 | 1.7 | 5.0 | 6.7 | 7.5 | 3530 | 2450 |
| | 2 | 91 | 66 | 18 | 14 | 4.0 | 1.6 | 5.5 | 6.6 | 7.6 | 3510 | 2440 |
| | 3 | 90 | 67 | 17 | 11 | 4.2 | 1.5 | 5.8 | 5.5 | 6.3 | 3400 | 2670 |
| | 4 | 97 | 65 | 20 | 13 | 3.9 | 1.5 | 5.4 | 5.1 | 6.2 | 3350 | 2340 |
| | 5 | 95 | 61 | 21 | 16 | 4.2 | 1.7 | 5.5 | 5.7 | 6.7 | 3540 | 2670 |
| | 6 | 80 | 60 | 16 | 10 | 4.0 | 1.7 | 5.5 | 5.5 | 6.5 | 3490 | 2640 |
| II | 7 | 79 | 61 | 13 | 9 | 11.5 | 8.8 | 3.7 | 5.7 | 6.1 | 2470 | 1750 |
| | 8 | 90 | 65 | 17 | 13 | 23.5 | 21.1 | 1.3 | 3.4 | 4.5 | 1720 | 1210 |
| | 9 | 92 | 62 | 20 | 15 | 25.9 | 23.5 | 0.8 | 2.6 | 3.7 | 1780 | 1310 |
| III(a) | 10 | 84 | 61 | 16 | 9 | 24.9 | 23.5 | 1.3 | 1.9 | 3.0 | 1750 | 1350 |
| | 11 | 89 | 63 | 17 | 15 | 25.2 | 22.5 | 4.4 | 1.6 | 3.1 | 1820 | 1290 |
| | 12 | 93 | 65 | 18 | 13 | 24.1 | 21.3 | 4.5 | 1.8 | 3.2 | 1750 | 1310 |
| | 13 | 87 | 59 | 18 | 12 | 24.2 | 20.8 | 3.1 | 1.1 | 2.9 | 1780 | 1360 |

Fig. 8H

COMBINED ACTIVATED SLUDGE-BIOFILM SEQUENCING BATCH REACTOR AND PROCESS

CROSS REFERENCE TO RELATED APPLICATIONS

Pursuant to 35 USC § 119(e), this application claims benefit of prior U.S. provisional application 60/393,043, filed Jun. 28, 2002.

FIELD OF INVENTION

This invention relates to sewage and wastewater treatment and in particular to biological treatment of wastewater using a sequencing batch reactor configuration.

BACKGROUND OF INVENTION

While very basic technologies such as land & grass filtration, septic tanks/soak-away pit and stabilization ponds are still widely and appropriately used in many developing countries, these technologies are only able to meet non-stringent discharge standards. More advanced technologies must be used to meet increasingly more stringent effluent discharge requirements. These advanced technologies are based on the use of microbial activity under aerobic and/or anaerobic and/or anoxic treatment conditions to meet different and multiple treatment objectives. Treatment objectives range from the removal of simple organics (biological oxygen demand [BOD], chemical oxygen demand [COD], total organic carbon [TOC]) and total suspended solids [TSS] removal to the meeting of stringent nutrient (nitrogen [N], phosphorus [P]) discharge standards and the removal of complex organics and/or toxic contaminants.

Biological wastewater treatment technologies may be classified using a number of categories that relate to the presentation of the biomass, flow, operation, configuration. etc. of the treatment process.

These categories include, but are not limited to:

Flow: dispensing of the wastewater into, out of, and within the system, which may be a continuous or intermittent process;

Operation: the control and operation of the system, which may be continuous or intermittent for the operational parameters, e.g. flow, volume, aeration, temperature, pH, mixing, recycling, excess sludge wastage rate, etc.

Biomass: micro-organisms that are used for the removal of waste material. The biomass may be attached as a biofilm on the surface of a carrier or cultured in a suspension generally known as activated sludge;

Sludge: used to refer to the different types of biomass in the reactor, e.g. activated sludge, waste sludge, nitrifying sludge. For this invention, the term "sludge" is used with emphasis on its uniqueness in achieving treatment objective(s) and is in the form of biofilm when it is fixed on a carrier, and/or activated sludge when it is suspended in the liquid.

Carrier: support medium (numerous types) used for attachment of a film of biomass. The carrier may be made of different materials (examples include but are not limited to wood chips, gravel, ceramics, alloy, plastics, rubber, recycled tyres), and may be mobile (i.e. freely movable within the tank) or fixed (i.e. immobilized or attached to the tank with limited movement)

Tank: major physical structure(s) for containment of liquid. A tank may also have the same meaning as reactor or bioreactor. Reactors may be sub-divided into tanks, and the tanks into sub-tanks. Other similar terms such as "basin", etc. will not be used herein for clarity.

Stage: the predominant biochemical or bioreaction function in the pollutant removal process, for example removal of carbonaceous, nitrogenous (nitrification function and/or denitrification function, etc.) or phosphorous compounds. In any system, there may be different tanks or tanks/sub-tanks that are used to perform different stages of pollutant removal. These are typically configured and operated differently from the other stage(s) to achieve the predominant function.

Reactor: Tanks of the wastewater treatment plant, which may include chemical, physical, biological, etc. processes.

Clarification: process wherein the biomass is separated from the water to produce the final effluent, e.g. using secondary clarifier, SBR during settling phase, etc.

Bio-selector: optional initial stage where the biomass first contacts the wastewater wherein conditions of initial high food: microorganism ratio (F/M) or floc-load are established to enhance the biomass characteristics, particularly minimization of bulking and foaming bacteria. Many types (e.g. aerobic, anoxic, anaerobic or their combination) and designs are available.

Each combination has various advantages and disadvantages that may make them more suitable, space-efficient and cost-effective for one or another application.

Current Available Technologies: Aerobic (Full or Partial) Treatment Processes Activated Sludge Processes Activated sludge (AS) processes are the currently most widely used treatment systems. They are capable of meeting very high effluent BOD/COD and nutrient discharge standards. Wastewater is mixed with suspended biomass, and the resulting mixed liquor typically flows continuously through the treatment system. Thus, the AS is subjected to different conditions. The pollutants are converted to solids (biomass or sludge) and/or gas with the production of water through their metabolic processes and under the following typical conditions as regards oxygen species:

1. Organic removal only: under fully aerobic conditions;
2. Organic and nitrogen removal only: under aerobic and anoxic conditions;
3. Organic, nitrogen and phosphorus removal: under aerobic, anoxic and anaerobic conditions.

Following biological wastewater treatment the biomass must be separated from the wastewater so that treated effluent may be discharged. This separation is normally done using gravity sedimentation or forced clarification. To facilitate the separation process, the operating mixed liquor suspended solids (MLSS) concentration is typically restricted to <3,500 mg/L. The excess sludge produced, as the end product of biological wastewater treatment, requires further treatment, usually digestion and/or dewatering.

Growth of slow growing and sensitive bacteria such as nitrifiers and those required to break down complex refractory organics is a rate-limiting step that requires long operating sludge ages to achieve the desired effluent quality. The resultant low food:microorganism ratio (F/M) results in large volume bioreactor tanks. For nutrient removal, additional anaerobic/anoxic tanks must be added.

The secondary clarifiers also have large volume requirements, particularly if the operating sludge age is long, which typically results in poorly settling sludge. Handling of the excess sludge also requires substantial capital investment and higher operating costs. The tanks and clarifiers also require large areas for their construction. In highly populated regions, land limitations restrict the feasibility of using conventional activated sludge with clarifier systems.

Sequencing Batch Reactor (SBR) Activated Sludge Processes

To eliminate separate secondary clarification units, fill-and-draw or batch treatment systems such as the Sequencing Batch Reactor (SBR) were revived. In these SBR systems, which use activated sludge and cyclic time-oriented ON/OFF operation, the entire treatment tank is also used as a clarifier. A high degree of process control of all unit operations enables high treatment standards to be met.

In the second generation of SBR technology (SBR2), floc-load controlled bio-selector and separate anaerobic/anoxic tanks, similar to those of the conventional continuous flow AS systems, were introduced to provide filamentous bulking and foaming control and better nutrient removal, respectively. However, the SBR systems are still hydraulically limited with resultant large reactor tank(s) by the need for long operating sludge ages as restricted by the large unaerated mass fraction of typically 50% which result in large MLSS requirements and, consequently, a long time for settling of biomass and decant of treated effluent. Typical hydraulic retention time (HRT) ranges from 15–24 hours. Furthermore, during part of each cycle the decanters and the aeration diffusers are inactive giving, in effect, a fraction of 'inactive capital'.

Bio Film Processes

Biofilm systems are attached biomass systems that use a solid support medium or carrier(s) on which the biomass grows. Excess biofilms falls off the carriers such that a secondary clarifier (small) is still needed. Conventional biofilm systems include trickling filters, rotating biological contactors (RBC) and submerged aerated filters (SAF). These can be compact systems, but suffer from poor control of reaction conditions, problems with mixing and oxygen transfer, slow start-up and recovery times from upset, clogging, and a very complex ecology. Newer systems include the biological aerated filters (BAF), which rely on backwash of the fixed media to remove the excess biofilm.

Hybrid Processes—Combined Biofilm and Activated Sludge

In these relatively recent processes, both carriers (fixed or mobile) and activated sludge are in the same treatment system. Fixed carrier AS systems, such as activated trickling filters and aerated RBC systems, are used mainly for high strength wastewater treatment. They consist of fixed carrier biofilm systems with a downstream AS system to meet the required effluent discharge standards. In contrast, mobile biofilm carriers are incorporated in AS systems to treat low strength wastewaters for nitrification with and without denitrification. These technologies include moving bed bioreactor (MBBR) and sequencing biofilm batch reactor (SBBR), which consist of simply adding carriers to the reactor tank.

These hybrid processes offer advantages including a more compact footprint (smaller process volume) due to the independence of the HRT from the operating sludge age. However, these hybrid systems also suffer from some of the same problems as the biofilm technologies, particularly, poor control of reaction conditions.

Current Available Technologies: Anaerobic Treatment Processes

Anaerobic treatment is a process that involves (1) the biological hydrolysis of particulates in the wastewater to soluble organic matter followed by conversion of soluble organics to short chain organic acids and (2) the production of gas (methane and carbon dioxide), all in the absence of oxygen.

Anaerobic treatment is suitable to treat high strength industrial wastewaters and side-stream(s) of large municipal sewage treatment works. However, meeting typical effluent discharge requirements is difficult and there is no nutrient removal capability. A downstream aerobic treatment is sometimes used. The methane produced may be used to generate energy.

Low technology systems (low reaction rate/large volume) have historically been used for a range of applications. Typical current-day applications include digestion of sludges and solid waste, and pond treatment. Two-stage high-rate anaerobic processes have been developed in recent years with higher reaction rates and low HRT (e.g. one day). High-rate treatment is widely used for high strength soluble organics industrial waste, and occasionally for the treatment of sewage.

In the first stage, incoming organic carbon is converted to small chain organic acids in a continuously fed, stirred-tank reactor. In the second stage, the acids are converted to methane and carbon dioxide gas. The organisms generally grow together in flocs or on artificial media, and are relatively slow growing and pH sensitive. Operating temperatures may be either in the thermophilic or mesophilic range.

Many anaerobic reactor designs are available, including Upflow Anaerobic Sludge Blanket (UASB), Contact (or Internal Circulation) Reactor, Fixed Film/Bed Reactor, Hybrid, Fluidised Bed (FB) and Expanded Granular Sludge Blanket (EGSB). The main technical challenge and focus has been stability of the second stage, but little (if any) attention has been made to improvements in the first stage. A common limitation is poor control of reaction conditions.

It is therefore the object of this invention to provide a new and improved method of wastewater treatment using a new hybrid SBR technology.

SUMMARY OF INVENTION

In accordance with the object of the present invention, there is provided in one aspect a system (also referred to as the SBR3 system) for treating wastewater comprising at least one reactor. The reactor includes at least a first tank interconnected to a second tank for retaining wastewater therein and discharging wastewater therefrom. The tanks are provided with means for influence and means for effluence to allow fluid level within at least one tank to be fillable to a filled level and decantable to a lower discharged level. Independently controllable first and second means for stage generation are provided for each the first and second tank respectively. Within the tanks, carriers for growth of biomass are also provided. A controller for controlling the operation of the first and second means for stage generation is provided such that biofilm biomass suitable for one bioreaction stage is selectively grown on the carriers as a first sludge within the first tank, and biofilm biomass suitable for a second bioreaction stage is selectively grown on the carriers as a second sludge within the second tank.

The means for stage generation may be any devices or built-in design of the system that allows the desired conditions to be attained for the appropriate bioreactor functions. In the preferred embodiment, the means for stage generation comprises at least one mixer, aerator, gas generator, heater, cooler or pump or a combination thereof to control the operation parameters such as oxygen, redox (ORP), temperature, pH and fluid level for further control of stage conditions.

In one implementation, the first tank and the second tank are partitioned by a separation wall therebetween, with openings provided in the wall for the wastewater and biomass (activated sludge) or mixed liquor to flow therebetween. This allows the two tanks to act as a single SBR unit with the same fluid level achieved during the fill and decant sequences. In an alternative implementation, the wall separating the two tanks may be shorter than the side-walls of the reactor, with the means for influence provided in the first tank, and the means for effluence provided in the second tank. In such an implementation, the complete filling of the first tank will cause overflowing of the wastewater or mixed liquor into the second tank, and decanting occurs only in the second tank.

In yet another preferred embodiment, the system further includes an optional third tank and recycling means for connecting the first and/or second tanks thereto. The recycling means may be, for example, a pump and its related piping that are adapted for transferring mixed liquor from bioreaction in the first or second tanks into the third tank for the next stage of bioreaction. Alternatively, the third tank may be partitioned from the first and/or second tank by a separation wall in the same way as described above for separation between the first and second tanks.

Activated sludge biomass is also present and suspended in the mixed liquor. This activated sludge is comprised of biofilm biomass that has fallen off from the biofilm carriers of different stages, if the activated sludge is allowed to mix together. This activated sludge may enhance the functions to achieve the specified treatment objectives. However, there are reaction conditions, with and without the addition of one or more stage(s), necessary to allow a specific sludge with an enhanced function to achieve a different treatment objective(s) as different from the biofilm biomass of each individual stage(s).

According to the user's needs, an optional fourth tank may be further provided and adapted to receive wastewater or mixed liquor from the third tank for yet another stage of bioreaction, if desired. The same type of connecting means and separation wall may also be provided as described above for connection and recycling between the four tanks according to the user's requirements.

More bioreaction stage(s) and sludge(s) may be added to achieve different treatment objective(s).

In another aspect of the present invention, a method is provided for treating wastewater using at least one reactor containing at least a first tank and a second tank interconnected therebetween. The tanks are provided with carriers for growth of biomass thereon. This method includes the steps of dispensing wastewater into the first and, optionally, second tanks; controlling the operating conditions separately such that a first condition is created for growth of a first biomass attached on the carriers as a first sludge suitable for a first bioreaction stage within the first tank, and a second condition is created for growth of a second biomass attached on the carriers as a second sludge suitable for a second bioreaction stage within the second tank; and decanting the wastewater in at least one tank after treatment therein. The operating conditions to be controlled depends on the user's needs, and may include, among other parameters the oxygen, pH. temperature, fluid level and hydraulic of the wastewater in the first and second tanks In one implementation of the method, the first stage is anoxic denitrification, and the first condition is pollutant removal without aeration, whereas the second stage is aerobic nitrification, and the second condition is produced, for example, by aerating the carriers containing biomass to produce sufficient oxygen content in the second tank. In this regard, the first or second sludge together with the carriers on which they are attached is preferably denser than the mixed liquor used for treatment thereof; and the first or second condition is produced by varying the SBR operating conditions, for example, by control of aeration including intermittent aeration to cause intermittent suspension of the carriers in the first or second tank.

In another implementation, the reactor further includes a third tank, and the method further comprises transferring mixed liquor generated after bioreaction in the first or second tank into the third tank. As a further optional implementation, the reactor may include a fourth tank, and the method further comprises transferring mixed liquor from the third tank into the fourth tank. The bioreaction that may be carried out within the third and fourth tanks include, for example, carbon or phosphorus removal. Some useful combinations are described generally below, and further details are elaborated in the detailed description. To distinguish between existing SBR systems and those of the present invention, the term "SBR3" is also used below to refer to systems designed according to the present invention.

The SBR3 utilises a multi-stage and multi-tank configuration incorporating fixed and/or mobile biofilm carriers, and with or without a bio-selector. At least one of the tanks must be operated in an SBR mode (i.e. with defined time-oriented cycle operation, variable-volume operation with preset Top & Bottom water levels, etc). Also, the SBR3 must have at least two stages and two tanks. The operational parameters will be optimized in the tanks to produce highly efficient sludges, which is key to the improved efficiency of the SBR3.

The stage and the sludge which is generally associated with it are named herein according to their main functional role, as follows:

For Aerobic (full or partially aerobic) treatment:

| | |
|---|---|
| BS | RC, DN, P and enhancement of sludge settleability which is based on the minimization of the bulking and foaming filamentus bacteria |
| N | Nitrification |
| DN | Denitrification |
| P | Phosphorus removal |
| RC | Readily bio-degradable carbon removal |
| SC | Slowly bio-degradable carbon removal |

For Anaerobic (partially anaerobic) treatment:

| | |
|---|---|
| HP | Hydrolysis |
| AC | Acid formation |
| MP | Methane producing |

This new system combines the advantages of the prior art SBR, AS and biofilm systems to provide a compact, flexible, stable, robust, shock-resistant system that can provide a high quality effluent that is cost and space effective. SBR features such as compact modular configuration, and a high degree of process control are enhanced while the robust nature and reduced clarification requirements of the biofilm systems are incorporated.

The SBR3 will be capable of meeting any one or a selected number of biological treatment objectives (i.e. biochemical or functional stages), depending on how the system is operated and/or configured. The SBR3 system can be tailored to exactly meet the treatment requirements, which may include removal of 1) total suspended solids (TSS) and organics (particularly the slowly biodegradable refractory organics), 2) TSS, organics, and nitrogen species (N), 3) TSS, organics, N and phosphorus species (P), etc.

The SBR3 may be applied to either intermittent or continuous influent flow patterns.

For example, the first tank in the SBR3 multi-sludge and multi-stage process may contain high rate organic degrading (RC) and/or denitrifying (DN) sludge(s) in the carrier (fixed or mobile) and/or in the mixed liquor, where anaerobic/anoxic/aerobic conditions may be maintained according to the process operation. Slow growing bacteria such as nitrifiers, which are rate limiting in AS systems, attach to the carriers in the subsequent SBR-mode reaction tank where aerobic conditions are plentiful. This biofilm is the nitrification (N) sludge. Consequently, the MLSS concentration can be optimized/minimized allowing rapid settlement and removal of effluent for maximum hydraulic capacity.

For aerobic treatment, the carriers also allow less costly coarse bubble diffusers and jet aerators to be used with similar oxygen transfer efficiency to that of the membrane fine-bubble diffusers. The ability of the system to simultaneously have both aerobic and anoxic conditions present at the same time may allow simultaneous nitrification-denitrification to be achieved and N removal to be promoted and increased.

Another flexibility is that under peak flow conditions, the tank for effluence will not be aerated or mixed and will be operated for continuous settling/clarification and discharge only.

The process configuration and modes of operation for the SBR3 depend upon the characteristics of the wastewater to be treated and the effluent discharge requirements. The following is a list of illustrative applications of the SBR3 invention for specified wastewater treatment objectives. Note that the terms "aerobic", "anoxic", and "anaerobic" refer only to the predominant condition of a stage and do not exclude the occurrence of the other conditions (e.g. SBR mode typically has some un-aerated time period for settle/decant).

Aerobic (Full or Partially Aerobic) Treatment

1. Two-sludge SBR3 Processes for Organics & Suspended Solids Removal Only
a) Two-stage aerobic—aerobic process (illustrated in Case 1 in the following section)
b) Three-stage aerobic—aerobic-aerobic process An example for the abovementioned configuration is one stage for readily biodegradable organics removal (Stage RC) and two stages for two different types of slowly biodegradable organics removal (Stages SC1 and SC2), with RC sludge cultivated as a biofilm on the fixed or intermittently suspended carriers in Stage RC (main role: readily biodegradable organics removal) and the SC sludges found as the biofilms on the suspended carriers in Stages SC1 and SC2 (main role: two different types of slowly biodegradable organics removal).

2. Two-sludge SBR3 Processes for Organics-Suspended Solids-Nitrogen Removal only
a) Two-stage alternating anoxic/aerobic-anoxic/aerobic process (illustrated in Case 2 in the following section)
b) Two-stage alternating anoxic/aerobic-aerobic process
c) Two-stage anoxic-aerobic process An example for the abovementioned configuration is one stage for nitrification (Stage N) and one stage for denitrification (Stage DN), with DN sludge cultivated as a biofilm on the fixed carriers in Stage DN (main role: denitrification) and the N sludge found as the biofilm on the suspended carriers in Stage N (main role: nitrification)

d) Two-stage aerobic-anoxic process

An example for the abovementioned configuration is one stage for partial nitrification, ie. Nitritation, conversion of $NH_3$—N to $NO_2$—N (Stage N) and denitrification (Stage DN) with either ammonium or external carbon addition, with DN sludge cultivated as a biolfilm on the fixed carriers in Stage DN (main role: denitrification) and the N sludge found as the biofilm on the suspended carriers in Stage N (main role: nitrification)

3. Two-sludge to Three-sludge SBR3 Processes for Organics-suspended Solids-phosphorus Removal and Nitrification Only
a) Two-stage alternating anaerobic/aerobic-aerobic process
b) Three-stage anaerobic-aerobic-aerobic process An example for the abovementioned configuration is one stage for nitrification (Stage N) and for phosphorus removal (Stages P1 and P2), with N sludge cultivated as a biofilm on the suspended carriers in Stage N (main role: nitrification) and the P sludge found as the biofilm on the suspended carriers or mixed liquor (the activated P sludge) in Stages P1 and P2. The activated P sludge, which is suspended and flowing through Stages P1 and P2 only or all the stages (main role: Phosphorus removal by cyclic anaerobic phosphorus release and aerobic uptake)

4. Two-, Three- and Multi-sludge SBR3 Processes for Organics-suspended Solids-phosphorus and Nitrogen Removal
a) Two-stage alternating anaerobic/anoxic/aerobic-aerobic
b) Two-stage alternating anaerobic/anoxic/aerobic-anoxic/aerobic
c) Three-stage anaerobic-anoxic-aerobic process (illustrated in Case 3 in the following section)
d) Three-stage alternating anaerobic/anoxic-aerobic-aerobic process
e) Three-stage alternating anaerobic/aerobic-anoxic/aerobic-aerobic process
f) Three-stage alternating anaerobic/anoxic-anoxic/aerobic-aerobic process
g) Three-stage alternating anaerobic/anoxic-anoxic/aerobic-anoxic/aerobic process
h) Three-stage alternating anaerobic/anoxic/aerobic-anoxic/aerobic-aerobic process
i) Three-stage alternating anaerobic/anoxic/aerobic-anoxic/aerobic-anoxic/aerobic process An example for the abovementioned configuration is the same as any one of the above two-sludge SBR3 processes for organics-suspended solids-nitrogen removal except that a third stage (Stage P) was added for phosphorus removal, with the third P sludge either growing on the carriers as a biofilm or consisting of the activated P sludge, which is suspended and flowing through all of the tanks (main role: phosphorus removal by cyclic anaerobic phosphorus release and anoxic/aerobic uptake)

Anaerobic (Fully Anaerobic) Treatment

1. Two-, Three- and Multi-sludge SBR3 Processes for Organics-suspended Solids Removal and Methane Production
a) Two-stage anaerobic-anaerobic process An example for the abovementioned configuration is one stage for hydrolysis of particulate organics and production of short-chain organic acids (Stage HP-AC) and methane production (Stage MP), with HP-AC sludge cultivated as a biofilm on the intermittently suspended carriers in Stage HP-AC (main role: hydrolysis of particulate organics and production of short-chain organic acids) and the MP sludge found as the biofilm on the suspended carriers or mixed liquor in Stage MP (main role: methane production)

b) Three-stage anaerobic-anaerobic-anaerobic process (illustrated in Case 4 in the following section)

An example for the abovementioned configuration is one stage for hydrolysis of particulate organics (Stage HP) and production of short-chain organic acids (Stage AC) and methane production (Stage MP), with HP sludge cultivated as a biofilm on the intermittently suspended carriers in Stage HP (main role: hydrolysis of particulate organics), AC sludge cultivated as a biofilm on the intermittently suspended fixed carriers in Stage AC (main role: production of short-chain organic acids) and the MP sludge found as the biofilm on the suspended carriers or mixed liquor in Stage MP (main role: methane production)

Using the high level of controllability of the present invention, wastewater containing different types of pollutants may be removed effectively, efficiently and inexpensively.

BRIEF DESCRIPTION OF THE FIGURES

FIG. 8C is a table to list the data of the average influent characteristics of STW site#1 during a 5-day period.

FIG. 8D is a table to list the data of the average effluent characteristics of SBR3 at STW site#1 during a 5-day period.

FIG. 8E is a table to list the data of the average effluent characteristics of conventional SBR at STW site#1 during a 5-day period.

FIG. 8F is a table to list the data of the average influent characteristics of STW site#2 during a 5-day period.

FIG. 8G is a table to list the data of the average effluent characteristics of SBR3 at STW site#2 during a 5-day period.

FIG. 8H is a table to list the data of the average effluent characteristics of conventional SBR at STW site#2 during a 5-day period.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be construed as limiting, but merely as a basis for the claims and as a representative basis for teaching one skilled in the art to employ the present invention in virtually any appropriately detailed structure. For ease of description, the influent wastewater of all the systems is indicated as I, the air is indicated as A, and the effluent is indicated as E, and waste sludge is indicated as S in all the drawings without further explanation.

Figure 1:
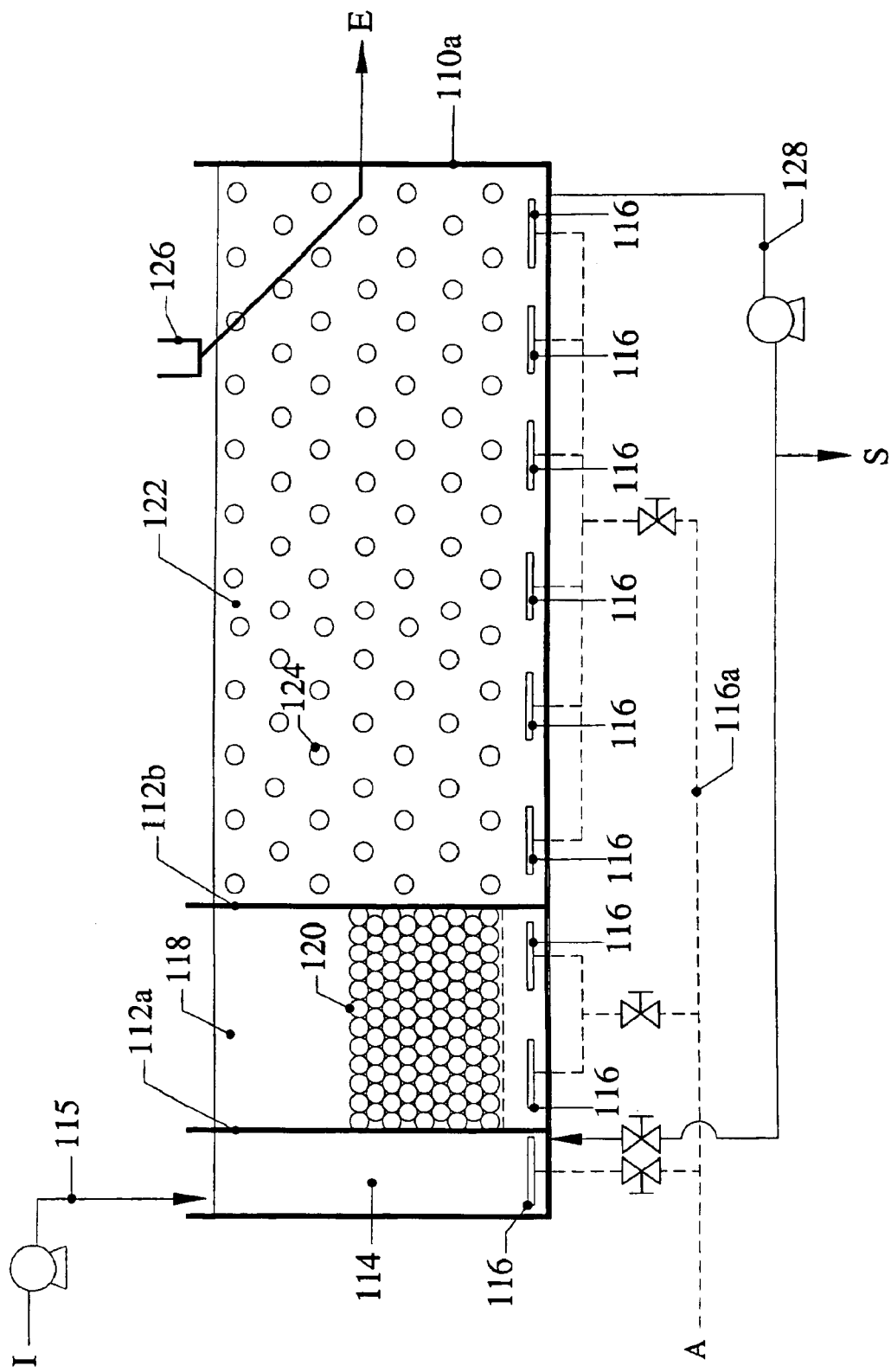
FIG. 1 is a drawing to illustrate a system according to one aspect of the present invention.

Referring to FIG. 1, the first embodiment exemplifying the present invention shows a system 110*a* with three tanks 114, 118 and 122 hydraulically interconnected together through openings in separation walls 112*a* and 112*b*. Tank 114 acts as an optional bio-selector for the selection of the desired floc-forming micro-organisms. To provide aeration, air may be introduced through coarse bubble diffusers 116 through an aeration supply system 116*a* to provide for mixing and aeration for tanks 118 and 122. Optional intermittent aeration can also be provided by the same system 116 to bio-selector 114. Tank 118 contains sludge suitable for one bioreaction stage selectively grown on carriers 120. The carriers 120 are mobile carriers but may be allowed to remain settled at the bottom of the tank 118 by not activating the coarse bubble diffusers 116 and the aeration supply system 116*a* to cause mixing therein provided in the tank. Tank 122 contains second sludge suitable for another bioreaction stage selectively grown on the mobile carriers 124. Tank 114 receives the influent wastewater via influent system 115 and may also receive returned mixed liquor from tank 122 through recycle system 128. A device 126 to remove supernatant for effluent is provided in tank 122.

Figure 2:
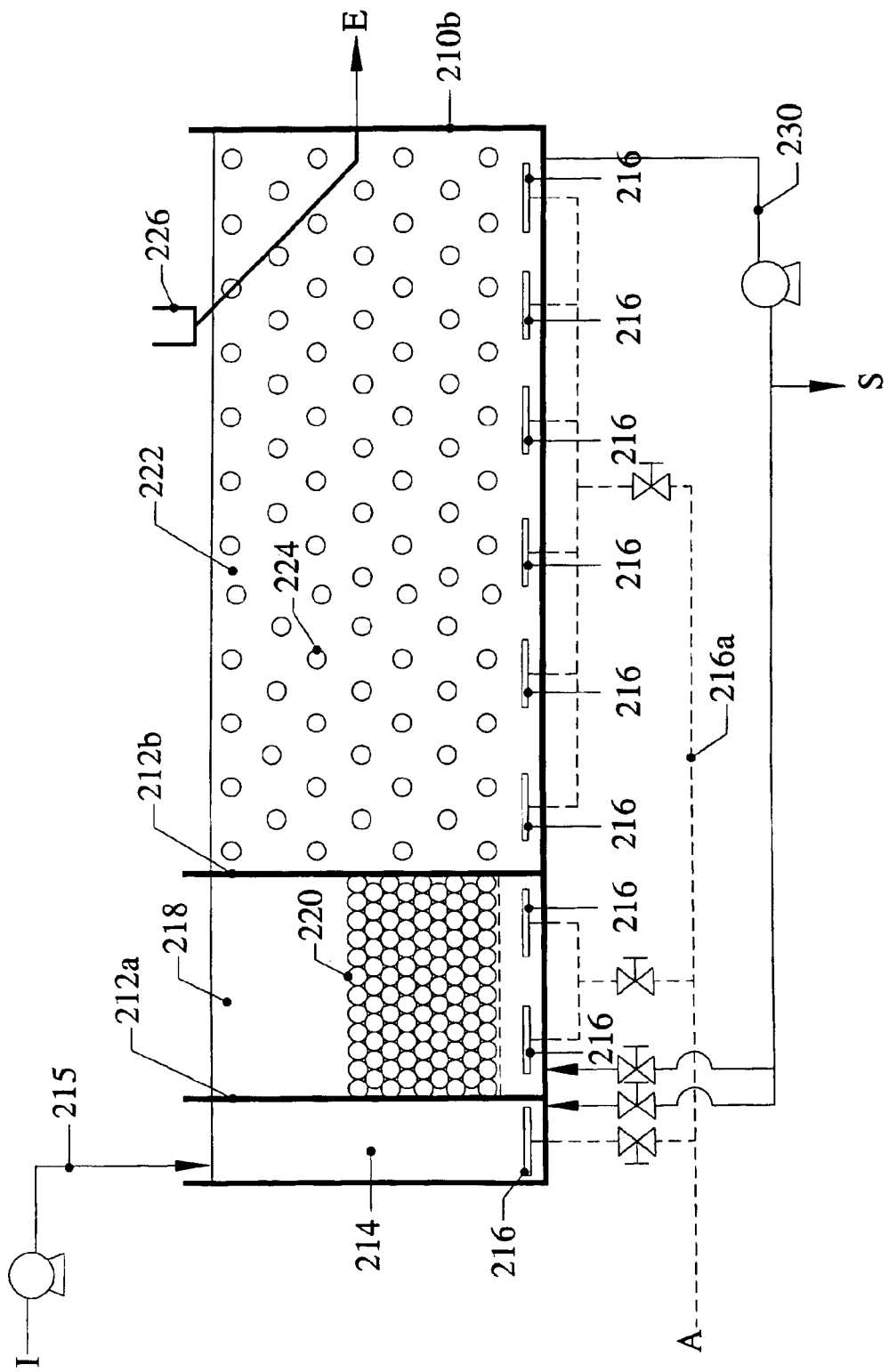
FIG. 2 is a drawing to illustrate a system according to another aspect of the present invention.

FIG. 2 shows another embodiment exemplifying the present invention with the same configuration as FIG. 1 except in system 210*b* the mixed liquor is recycled from tank 222 to tanks 214 and 218 via recycle system 230.

Figure 3:
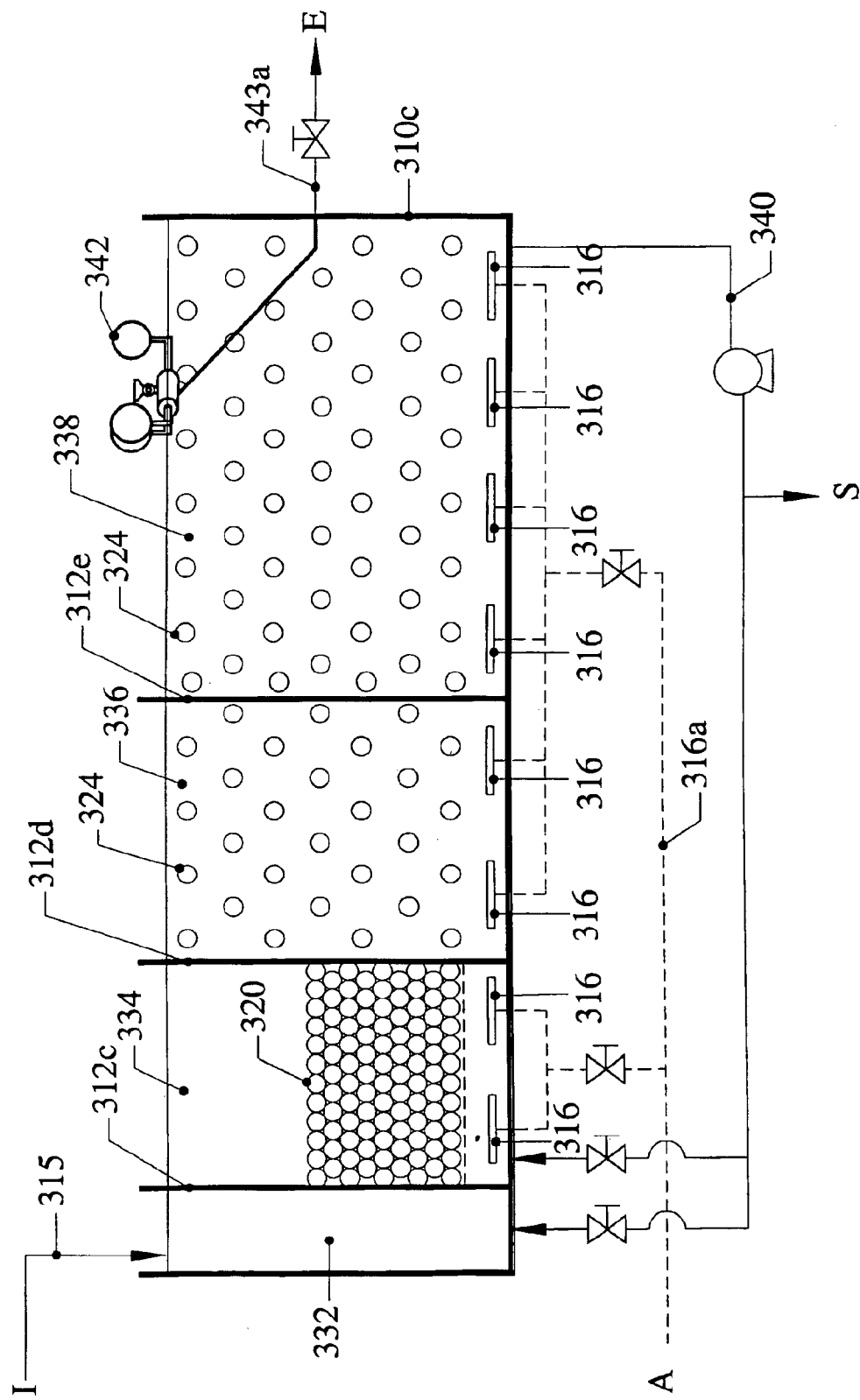
FIG. 3 is a drawing to illustrate a system according to another aspect of the present invention.

Referring to FIG. 3, the third embodiment exemplifying the present invention shows a system 310*c* with four tanks 332, 334, 336 and 338 hydraulically interconnected together through openings in separation walls 312*c*, 312*d* and 312*e*. Tank 332 acts as a bio-selector for the selection of the desired floc-forming micro-organisms with no aeration and mixing provided. Tank 334 contains sludge suitable for one bioreaction stage selectively grown on carriers 320. Tanks 336 and 338 contain the second sludge suitable for another bioreaction stage selectively grown on the mobile carriers 324 and may be allowed to set up different conditions and parameters, e.g. the volume percent of carriers, in each individual tank for the pilot purpose. Tank 332 receives the influent wastewater via influent system 315 and may also receive returned mixed liquor from tank 338 through a recycle system 340. The mixed liquor may also be recycled to tank 334 through the same system 340. To provide aeration, air may be introduced through coarse bubble diffusers 316 through the aeration supply system 316*a* to provide for mixing and aeration for tanks 334, 336 and 338. A variable-volume decanting device 342 is provided in tank 338. A device 343*a* to remove supernatant for effluent is also provided in tank 338.

Figure 4:
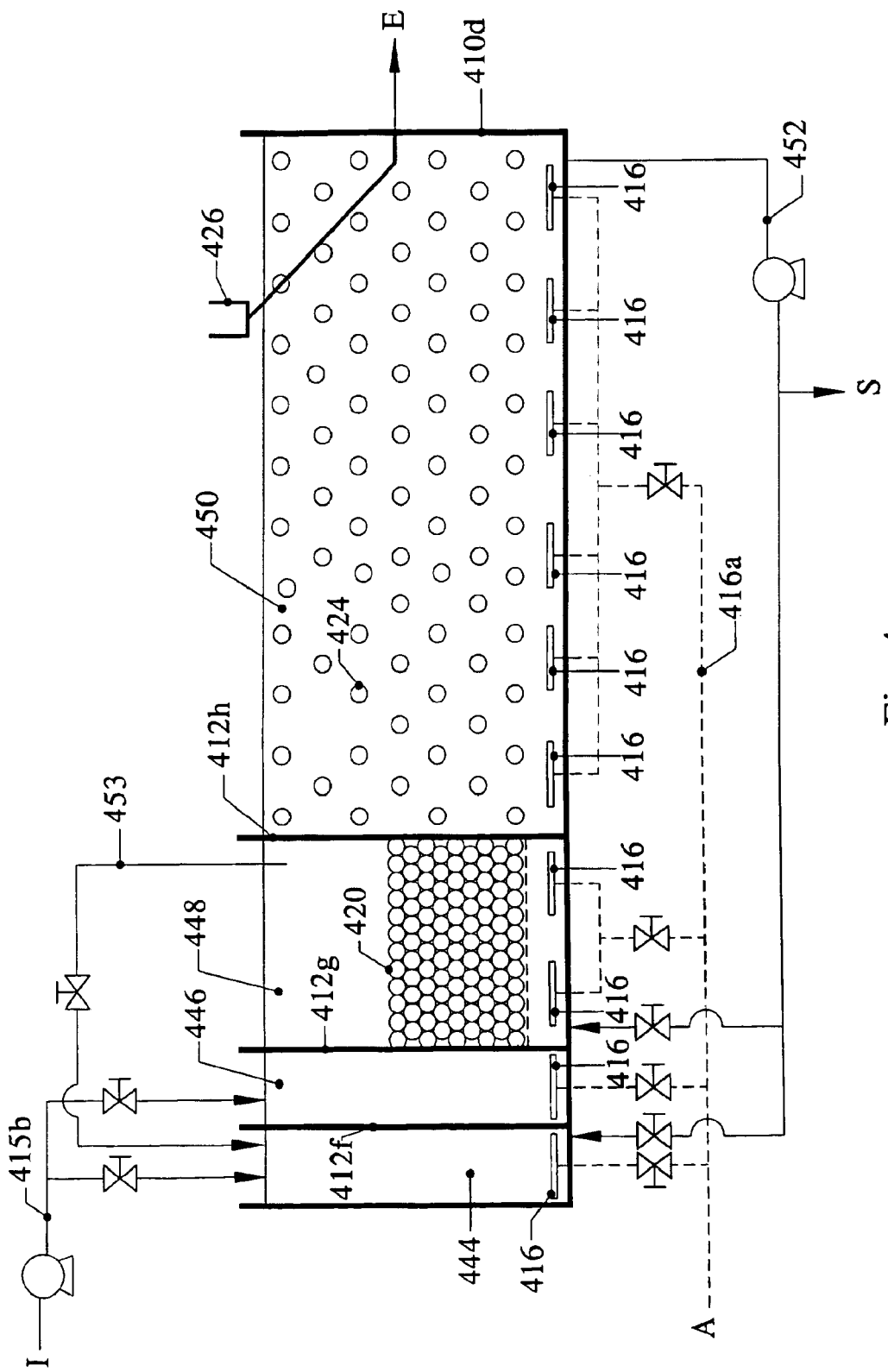
FIG. 4 is a drawing to illustrate a system according to another aspect of the present invention.

FIG. 4 shows another embodiment of the present invention of a system 410*d* with four tanks 444, 446, 448 and 450 hydraulically interconnected together through openings in separation walls 412f, 412g and 412h. In this implementation, there are no carriers in tanks 444 and 446 for retaining sludge selectively for one bioreaction. Instead, the first sludge is the activated sludge in all the tanks providing cyclic bioreactions, and the first stage is particularly associated with the tanks 444 and 446. Tank 448 contains the second sludge for another bioreaction stage selectively grown on mobile carriers 420. Tank 450 contains the third sludge for the third bioreaction stage selectively grown on the mobile carriers 424. Tanks 444 and 446 receive the influent waste water via influent system 415b. Tanks 444 and 448 may also receive returned mixed liquor from tank 450 through a recycling system 452. The mixed liquor may also be recycled from tank 448 to tank 444 through an optional recycling system 453. To provide aeration, air may be introduced through coarse bubble diffusers 416 through the aeration supply system 416a to provide for mixing and aeration for tanks 444, 446, 448 and 450. A device 426 to remove supernatant for effluent is provided in tank 450.

Figure 5:
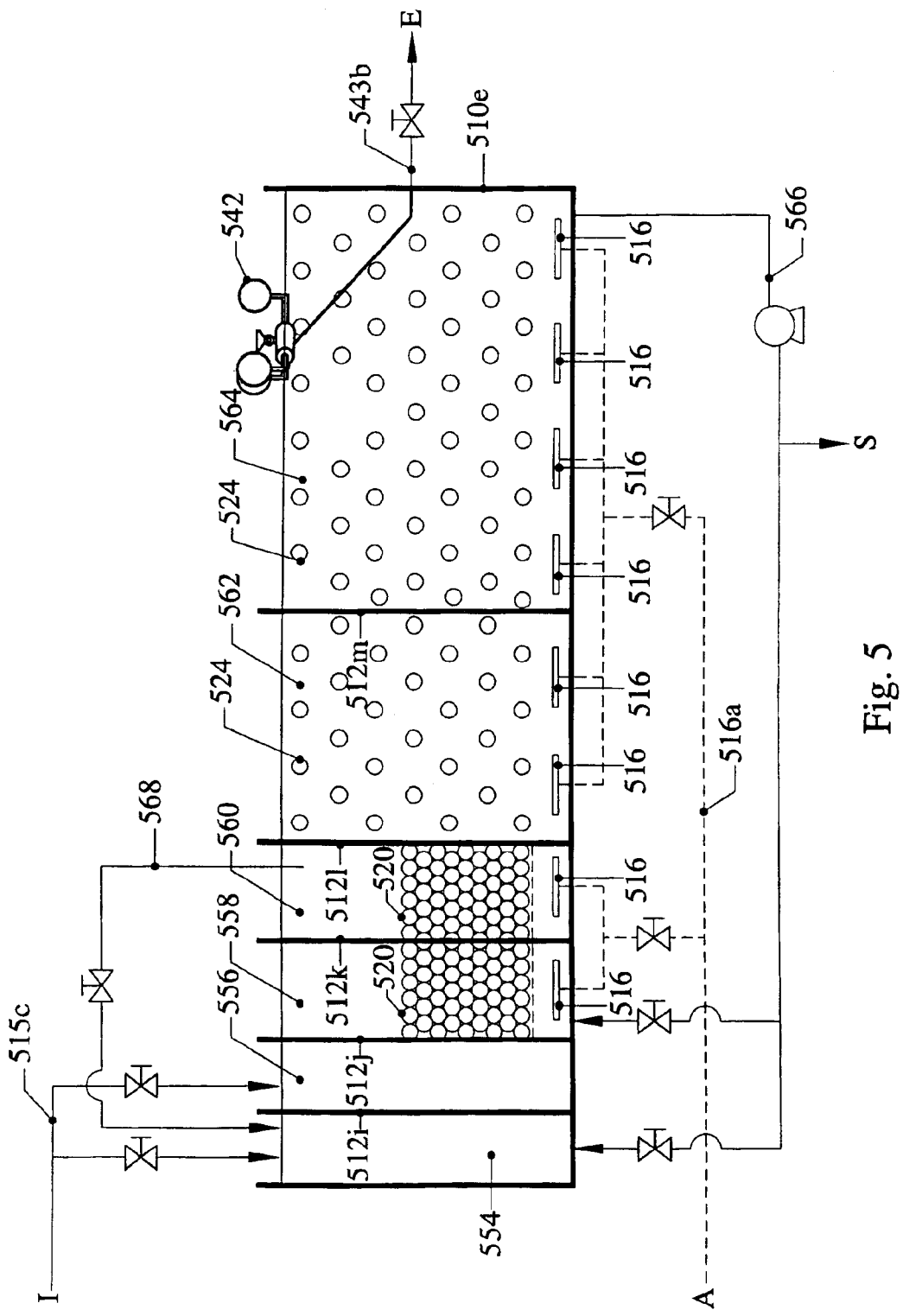
FIG. 5 is a drawing to illustrate a system according to another aspect of the present invention.

FIG. 5 shows another embodiment of the present invention of a system 510e with six tanks 554, 556, 558, 560, 562 and 564 hydraulically interconnected together through openings in separation walls 512i, 512j, 512k, 512l and 512m. Different conditions and parameters are allowed to be set up in different tanks for pilot purpose. There are no carriers in tanks 554 and 556 for retaining sludge selectively and no aeration or mixing is provided. Instead, the activated sludges flowing through all of the tanks is the first sludge providing cyclic bioreactions, and the first stage is particularly associated with the tanks 554 and 556. Tanks 558 and 560 contain the second sludge for another bioreaction stage selectively grown on the mobile carriers 520. Tanks 562 and 564 contain the third sludge for the third bioreaction stage on the mobile carriers 524. Tanks 554 and 556 receive the influent wastewater via influent system 515c. Tanks 554 and 558 may also receive returned mixed liquor from tank 564 through a recycling system 566. The mixed liquor may also be recycled from tank 560 to tank 554 through another recycling system 568. To provide aeration, air may be introduced through coarse bubble diffusers 516 through the aeration supply system 516a to provide for mixing and aeration for tanks 558, 560, 562 and 564. A variable-volume decanting device 542 is provided in tank 564. A device 543b to remove supernatant for effluent is provided in tank 564.

Figure 6:
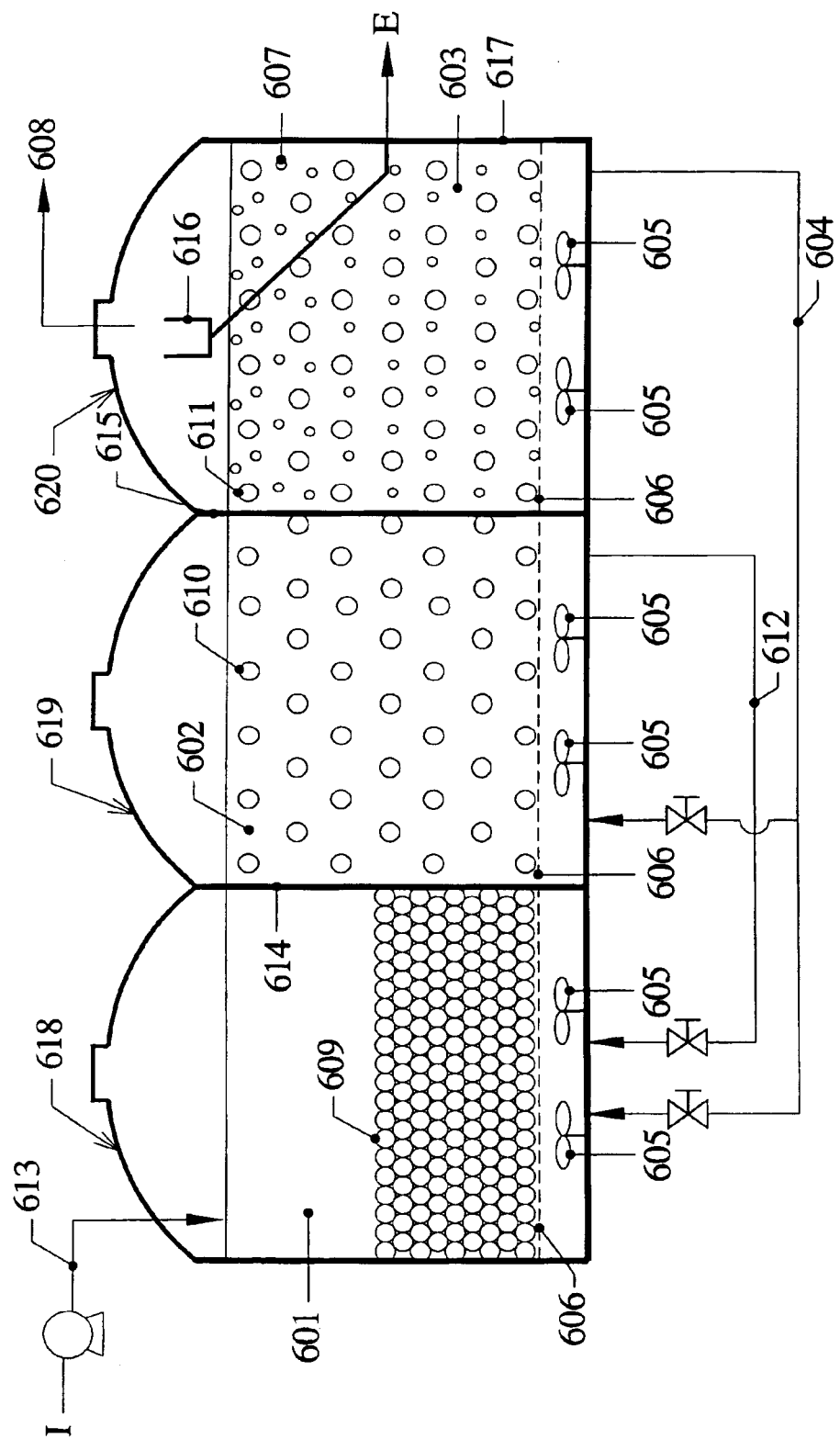
FIG. 6 is a drawing to illustrate a system according to another aspect of the present invention.

FIG. 6 shows another embodiment of the present invention showing system 617. Three closed tanks 601, 602 and 603 are hydraulically interconnected. A wall 614 separates first tanks 601 and second tank 602, while a wall 615 separates the second and third tanks 602 and 603. An influent system 613 connects to the first tank 601. Carriers 609, 610 and 611 are provided in tanks 601, 602, and 603, respectively. Mixing devices 605 are placed at the bottom of the three tanks. A separation mesh 606 is disposed near the bottom of the tank horizontally above the mixing devices in all the three tanks. The tanks 601, 602, and 603 are provided with covers 618, 619 and 620 respectively. A first recycle system 604 is provided and connects tank 603 with tanks 602 and 601. A second recycle system 612 is provided and connects tank 601 with tank 602. A decanting device 616 is provided inside tank 603. Means for collecting the gas is provided by a device 608.

The influent system 613 carries wastewater into the first tank 601. The influent wastewater flows from tank 601 to the second and third tanks 602 and 603 through the openings in separation walls 614 and 615. The movements of carriers 609, 610 and 611 within their respective tanks are controlled by controlling the operation of the mixing devices 605, e.g. intermittent mixing. The first recycle system 604 is used to return the mixed liquor from the third tank 603 to the first tank 601 and the second tank 602 respectively. The second recycle system 612 is used to return mixed liquor from the second tank 602 to the first tank 601. The decanting device 616 in the third tank 603 is used to remove supernatant for effluent. The tank covers 618, 619 and 620 are used to maintain anaerobic conditions and to retain gasses, such as the biogas bubbles 607 produced from tank 603. The tank cover 620 on tank 603 is connected to the biogas collection system 608.

EXAMPLES

Figure 7A:
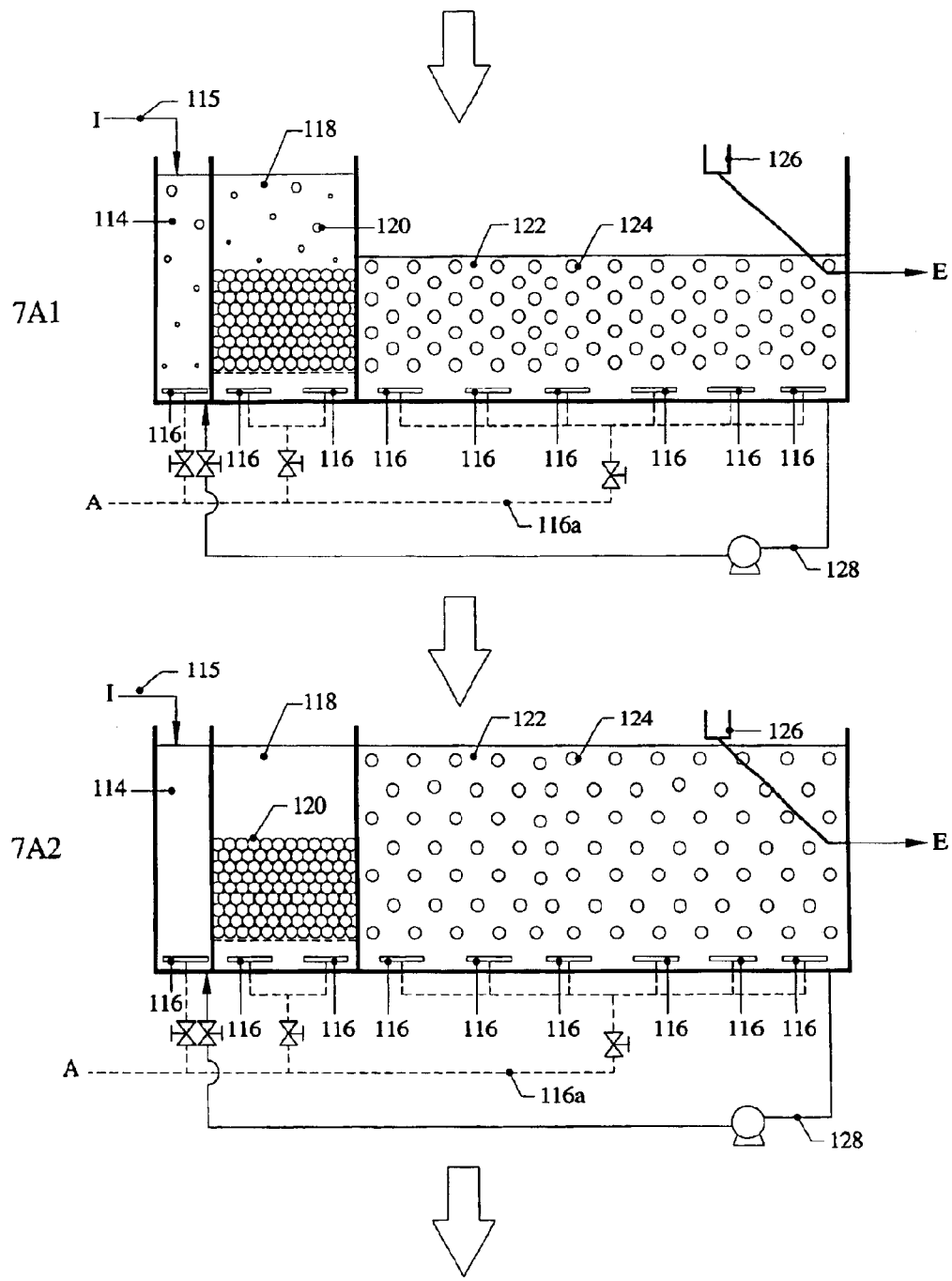
FIGS. 7A & 7B are drawings to illustrate the SBR cycle sequence of a two-stage two-sludge aerobic-aerobic SBR3 process using the system shown in FIG. 1.
Figure 7B:
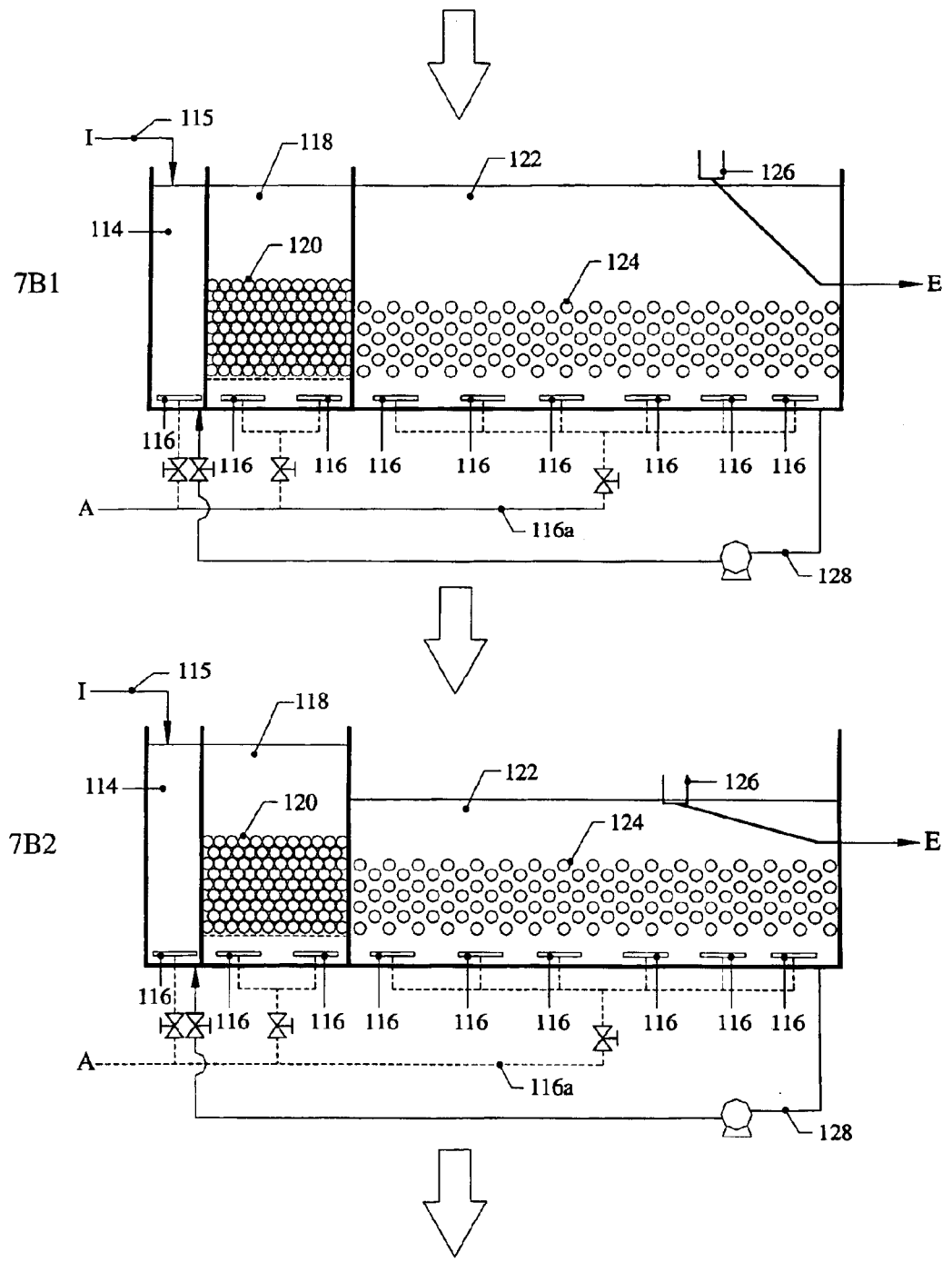

Four cases are described in detail for this invention:
Case 1 Two-stage and Two-sludge Aerobic-aerobic Process for Organics & Suspended Solids Removal Only One of the possible two-stage two-sludge SBR3 system configuration is illustrated in FIG. 1. The cycle sequence of the SBR3 process of case 1 is illustrated in FIGS. 7A and 7B. The cycle starts from step 7A1, going through steps 7A2, 7B1, and 7B2, and goes back to step 7A1. In this process, the three tanks are used for:

(1) the first stage RC (performed in the second tank 118); and
(2) the second stage SC (performed in the third tank 122).

For the ease description of the bio-chemical processes, the following description contains reference only to the bio-chemical stage without further reference to the particular tanks as shown in FIG. 1, 7A or 7B. It is understood that these processes are performed in the respective tanks.

In this case, the bioselector of RC Stage is shown as part of the RC Stage. This configuration consists of an RC Stage with RC Sludge on the mobile carriers that remain settled at the bottom of the tank when no external mixing is provided, and an SC Stage with SC Sludge on the mobile carriers. A variable-volume emptying device is provided in the SC Stage, which is illustrated in FIGS. 7A and 7B, where the wastewater level in the third tank varies. Note that in this case, the RC Stage has a constant volume, but can be designed as variable volume as well.

Either the BS (if present) or the RC Stage (assuming no BS Stage) receives influent wastewater and may also receive return mixed liquor from the SC Stage, either continuously or intermittently. The RC Stage is operated for high rate aerobic organics removal. Nitrate and/or nitrite may be either originally present in the wastewater or produced in the RC and/or the SC Stages from ammonia that may be present in the wastewater. In this case, the mixed liquor is recycled from the SC Stage to the RC Stage for denitrification when the aeration is limited or temporarily stopped. The RC Sludge is dominated by fast-growing bacteria, which are capable of degrading readily biodegradable organics. In this case, the carriers are, mobile carriers that remain near the bottom of the tank because they are slightly heavier than water, occupy 70% of the tank volume, and are provided for biomass attachment. The mobile carriers may be temporarily suspended by intermittent mixing or aeration.

Aeration may be provided by any means that can provide the proper conditions, e.g., natural gravity (e.g. waterfall), combination gravity and forced aeration, forced aeration etc. For the forced aeration, air may be introduced through coarse bubble diffusers to provide for mixing and aeration requirements. Despite the use of coarse bubble diffusers, the aeration system still approaches the efficiency of a fine bubble system due to the longer air retention time in the tank and break-up of coarse bubbles to smaller bubbles by the carriers. Up to or even more than 90% of readily biodegradable organics can be removed in the RC Stage due to the high concentration of attached biomass.

Mixed liquor in the RC Stage is in communication with mixed liquor in the SC Stage by any means of flow interconnection, e.g. overflow, channels, underflow pumping, etc. A mesh is placed at each opening to prevent any biofilm carriers from going from one stage to the other, but the activated sludge can pass through. The activated sludge containing some biofilm biomass also contributes to the treatment objectives, but is not associated with a particular stage in this case. An alternative would be to retain the mixed liquor sludge within the RC Stage instead of using carriers, and the RC Sludge would then consist of the retained activated sludge.

The SC Stage contains suspended carriers of up to 70% of the tank volume depending on the decant percentage and may be aerated using coarse bubble diffusers. This stage acts as a carbon removal polishing step and degradation of slowly biodegradable organics during the aeration sequence (SBR operation mode). Nitrification may not be an objective, but may not be avoidable. For more slowly biodegradable organics such as refractory organics, the HRT will be longer and the percentage of biofilm carriers will be higher to allow more attachment of the slow-growth bacteria on the carriers since the bacteria must be independent of the operating sludge age. Thus, the biofilm SC Sludge will have a unique composition. The SC Stage may also perform as a secondary clarifier for solids-liquid separation and return of MLSS to the RC Stage during the settle and decant sequences.

The duration of the SBR3 operating cycle can be less than two hours to up to day(s). The total HRT can be shorter than six hours. The RC Stage can employ either constant or variable volume operation while the SC Stage will be operated with variable volume mode. A bio-selector will optionally be incorporated to control biological foaming and bulking, particularly if the MLSS is high. Sludge wasting is either separately for each stage or together from the SC Stage during the settling sequence.

Figure 8A:
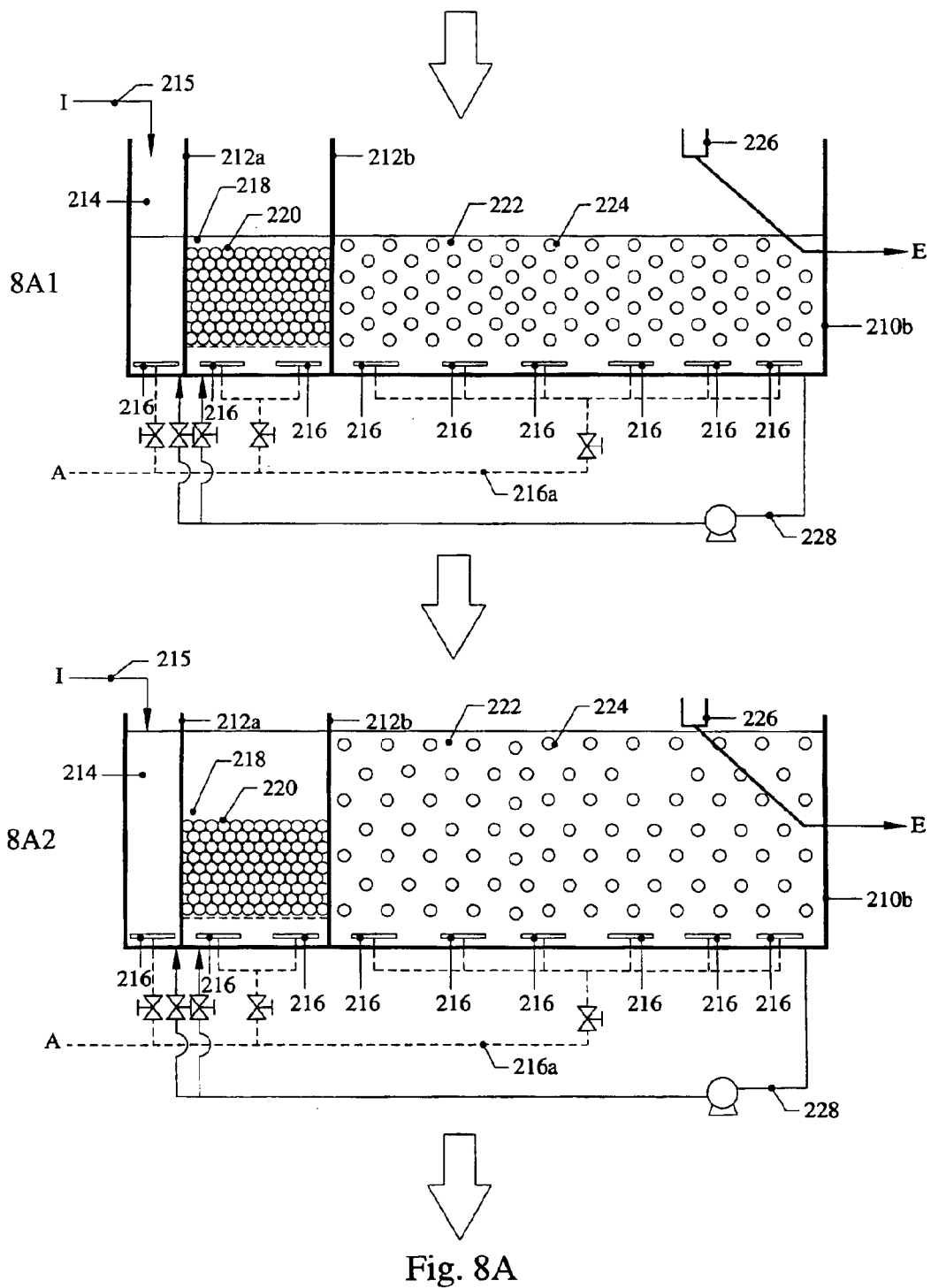
FIGS. 8A & 8B are drawings to illustrate the SBR cycle sequence of a two-stage two-sludge anoxic-aerobic SBR3 process using the system shown in FIG. 2.
Figure 8B:
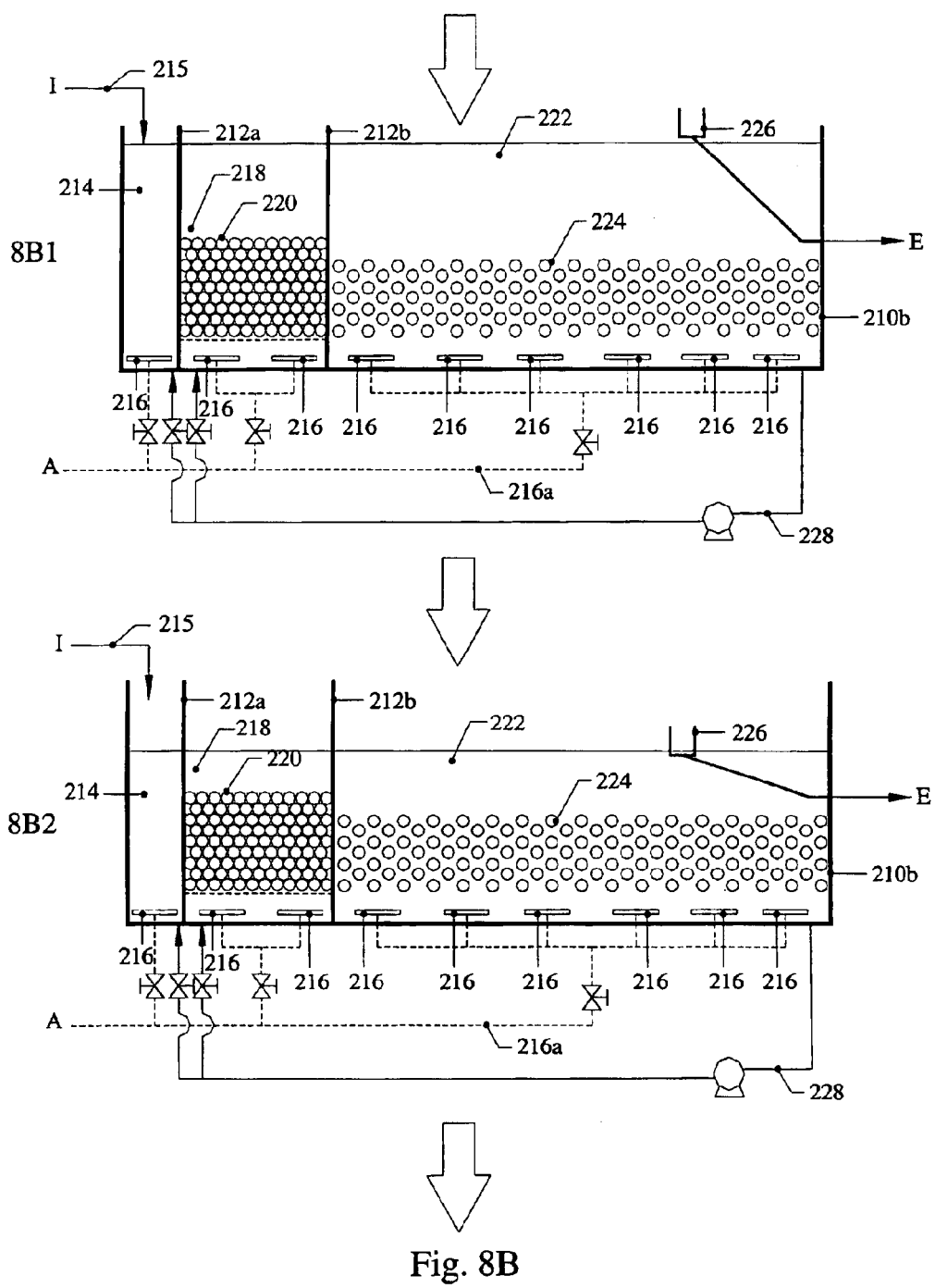

Case 2 Two-stage and Two-sludge Anoxic/Aerobic-anoxic/aerobic Process for Organics-suspended Solids-nitrogen Removal Only One of the possible two-stage two-sludge SBR3 system configurations is illustrated in FIG. 2. Note that an optional Bioselector (BS) is shown as part of the DN Stage. The cycle sequence of the SBR3 process of case 2 is illustrated in FIGS. 8A and 8B. The cycle starts from step 8A1, going through steps 8A2, 8B1, and 8B2, and goes back to step 8A1. In this process, the three tanks are used for:
(1) The first stage DN (performed in the second tank 218);
(2) The second stage N (performed in the third tank 222).

For the ease description of the biochemical processes, the following description contains reference only to the biochemical stage without further reference to the particular tanks as shown in FIG. 2, 8A and 8B. It is understood that these processes are performed in the respective tanks.

This configuration consists of a DN Stage with DN Sludge consisting of the biofilm on the carriers, and an N Stage with N Sludge consisting of the biofilm on the carriers. A variable-volume decanting device is provided in the N Stage, which is operated in SBR mode, as illustrated in FIGS. 8A and 8B, where the wastewater level in all the three tanks varies.

Similar to Case 1, the DN Stage receives influent wastewater and may also receive return mixed liquor from the N Stage, either continuously or intermittently. This DN Stage is operated for high rate continuous anoxic or alternating anoxic/aerobic denitrification and organics removal. The DN Sludge is dominated by the fast-growing denitrifying bacteria, which are also capable of degrading readily biodegradable organics. The mobile carriers remain near the bottom of the tank because they are slightly heavier than water, occupy up to 70% of the tank volume and are provided for biomass attachment. The mobile carriers may be temporarily suspended by intermittent mixing or aeration.

Aeration may be provided by any means that can provide the proper conditions, e.g. forced aeration intermittently through coarse bubble diffusers to provide for mixing and aeration requirements.

More than 90% of readily biodegradable organics can be removed in the DN Stage due to the high concentration of attached biomass. Mixed liquor in the DN Stage is in continuous communication with mixed liquor in the N Stage by any means of flow interconnection. Mixed liquor including activated sludge with sludge sloughed off from the biofilm flow on to the N Stage. A mesh is placed at each opening to prevent any carriers from going from one stage to the other.

The N Stage contains suspended carriers of up to 70% of the tank volume depending on the decant percentage and is aerated using coarse bubble diffusers. This stage operates with alternating anoxic/aerobic conditions (SBR operation mode) and acts as a nitrification and carbon removal polishing step and degradation of slowly biodegradable organics during the aeration sequence. For more slowly biodegradable organics such as refractory organics and/or wastewater containing nitrification inhibition substances, the HRT will be longer and the percentage of biofilm carriers will be higher to allow more slow-growth bacteria on the carriers for refractory organics degradation and slow-growth nitrifiers, since the bacteria must be independent of the operating sludge age. Thus, the biofilm N Sludge will have a unique composition. The N Stage may also perform as a secondary clarifier for solids-liquid separation and return of nitrified mixed liquor and MLSS to the DN Stage during the selected reaction sequences.

The duration of the SBR3 operating cycle can be less than two hours to up to twenty-four hours. The total HRT can be shorter than six hours. The DN Stage employs variable volume operation while the N Stage will be operated with variable volume mode A bio-selector will optionally be incorporated to control biological foaming and bulking if the MLSS is high. Sludge wasting is either separately for each sludge stage or together from the N Stage during the settling sequence.

Case 2 Experimental Data

Two fully automatic PLC controlled SBR pilot-scale reactors were built including an on-line wastewater sampling, monitoring and control system. The SBR3 included biofilm carriers with configuration as shown in FIG. 3 and the "conventional SBR" was identical to the SBR3 except that it had no biofilm carriers and was used as a control.

A Two-Stage Two-Sludge SBR3 was tested: one stage each for nitrification (N Stage) and denitrification (DN Stage), with DN Sludge on the mobile carriers that remain settled at the bottom of the tank when no external mixing is provided in the DN Stage (main role: denitrification) and the N Sludge consisting of the biofilm on the suspended carriers in N Stage (main role: nitrification). Activated sludge was also present, but not associated with any particular stage.

Configuration and Operation for Initial Phase of Testing

The initial configuration and operation of the SBR3 for nitrogen removal is shown in FIG. 3 and Table 1, respectively.

TABLE 1

Initial SBR3 Pilot Plant Configuration for Nitrogen Removal

| Main Function | Configuration & Operation | | Carrier Volume % |
|---|---|---|---|
| Denitrification | BS Stage | 50 L unaerated, variable vol. | None |
| | DN Stage | 150 L anoxic, variable vol. | 50% |
| Nitrification | N1 Stage | 200 L SBR cycle | 50% |
| | N2 Stage | 400 L SBR cycle | 33% |
| N/A | Total Reactor Volume | 800 L | N/A |
| | Total HRT | 10 Hrs | |
| | Mixed Liquor Recycle ratio | 20% N2 to BS & 80% N2 to DN (Total 160 L/Hr) | |
| | SBR cycle: | | |
| | FILL Volume | 320 L/cycle | |
| | FILL Rate | 160 L/Hr | |
| | Cycle Time | 4 Hrs | |
| | FILL-AERATE | 2 Hrs | |
| | SETTLE/NON-AERATE | 1 Hr | |
| | DECANT/NON-AERATE | 1 Hr | |

Note:
No carriers in Conventional SBR pilot plant (otherwise identical to SBR3)

The two pilot-scale SBR systems were set up and operated in parallel at two different municipal sewage treatment works in Hong Kong (Site #1 and Site #2).

The sewage of Site #1 contained a large fraction of industrial wastewaters while the sewage of Site #2 was high in salinity resulting from seawater used for toilet flushing. Both sewages were known to require long operating sludge ages to achieve nitrification.

The carriers and the pilot SBRs were seeded with activated sludge from full-scale STWs. On-line raw sewage was collected after the grit removal chamber of the respective STW and flowed through a strainer and into a holding tank to allow continuous collection of raw sewage. Any surplus sewage collected was directed back to the grit chamber. The SBRs were fed following the average daily diurnal flow pattern mimicking the actual flow to the respective full-scale STWs.

The pilot plants were operated through experimental phases as shown in Table 2. For the Phase I testing, the initial conditions detailed in Table 1 and FIG. 3 were employed at both sites in order to fully stabilize the plants. Then, at both sites, the operating sludge age was reduced to observe the nitrogen removal capability (Phase II).

At Site #1, Phase II testing was continued with changes in key operational parameters, and with one change in the amount of carriers employed, to observe the nitrogen removal capability. Continuous or alternating reaction conditions (aeration, intermittent or continuous sewage feed, and constant or variable volume operation) were tested.

At Site #2, not all Phase II testing was continued. Instead, the configuration and operation were changed to incorporate phosphorus removal for Phase III testing (as illustrated in Case 3 in the following section).

Operation and Configuration Changes for Trial Testing

The changes are listed in Table 2 for the testing at Site #1 and Site #2.

TABLE 2

Operation and Configuration Changes for Case 2 Demonstration

| Phase | SBR Modifications - Nitrogen Removal | Sludge Age | Days | Date |
|---|---|---|---|---|
| | Site #1 | | | |
| I | Conventional operation (i.e. typical operating sludge age) | 15 | 45 | 11/6/02 to 26/8/02 |
| II(a) | Reduce sludge age to less than critical sludge age of nitrifiers | 5 | 20 | 26/7/02 to 15/8/02 |
| II(b) | DN: Add intermittent aeration (i.e. alternating anoxic/aerobic). Conventional SBR not changed | 5 | 15 | 15/8/02 to 30/8/02 |
| II (c) | All tanks: Change to continuous feed DN: no aeration | 5 | 15 | 30/8/02 to 14/9/02 |
| II(d) | BS & DN: Change to constant volume operation. Decant volume increased from 40% to 53%. All tanks: intermittent feed | 5 | 15 | 14/9/02 to 29/9/02 |
| II(e) | N1: Change to constant volume & constant aeration Transfer carriers from N2 (33%–25%) to N1 (50%–66%). Increase number of cycles per day from 6 to 9 | 5 | 15 | 29/9/02 to 14/10/02 |
| | | Total | 125 | |

TABLE 2-continued

Operation and Configuration Changes for Case 2 Demonstration

| Phase | SBR Modifications - Nitrogen Removal | Sludge Age | Days | Date |
|---|---|---|---|---|
| | Site #2 | | | |
| I | Conventional operation (i.e. typical operating sludge age) | 15 | 30 | 21/11/02 to 21/12/02 |
| II | Reduce sludge age to less than critical sludge age of nitrifiers | 5 | 15 | 21/12/02 to 5/1/03 |
| | | Total | 45 | |

Details for Site#1
Phase I—To compare nitrogen removal performance and capacity between the Two-Stage Two-Sludge SBR3 process and a Conventional SBR (i.e. Two-Stage Single-Sludge) with conventional nitrification-denitrification operation. The SBR reactors were fine-tune and stabilized at 26° C. to 30° C. for at least two (2) sludge ages ($\geq 2*15$ days) such that good nitrification ($\leq 2$ mg/L effluent $NH_3$—N) and denitrification ($\leq 12$ ml/L effluent $NO_3$—N) was achieved. A conventional sludge age is approximately 15 days.
Phase II—The Phase II study was further divided as:
  (a) To study the potential minimum operation sludge age and MLSS concentration, where the Two-Stage Two-Sludge SBR3 and the Conventional SBR were operated at a sludge age to or below the identified critical sludge age (~5 days) with all other operating parameters constant for at least three (3) sludge ages ($\geq 3*5$ days). Nitrification performance was evaluated for both the SBR system until the conventional SBR achieved <30% nitrification, as compared to the SBR3. Critical sludge age is the biomass retention time below which the nitrifiers wash out of the bioreactor since their growth rate is too slow for them to maintain their population.
  (b) At the end of (a), intermittent aeration of the DN Stage was tested at the end of the FILL-AERATE sequence. This to provide intermittent mixing of the carriers settled on the tank bottom, i.e. temporary suspension only when the aeration is ON, in order to promote better and more uniform growth of the biofilm and also to minimize clogging and short circuiting of the wastewater. The reaction conditions, however, would change from continuous anoxic to alternating anoxic/aerobic. Duration was short and after feed of the sewage to prevent unnecessary aerobic losses of the organic carbon. The denitrification performance was evaluated for at least three (3) sludge ages. Intermittent aeration was stopped at end of (b).
  (c) At the end of (b), the inter mittent sewage feed was change to continuous feed, and the performance was evaluated. After a least three (3) sludge ages, the feed was change back to intermittent.
  (d) At the end of (c), the variable-volume operation of the DN (with BS) Stage was change to constant volume operation for at least three (3) sludge ages, and the performance was evaluated. The HRT was maintained by increasing the decant volume from 40% to 53% (variable vol.: N1 & N2).
  (e) At the end of (d), the variable-volume operation of the N1 Stage was changed to constant volume operation, and continuous aeration and continuous suspension of carriers for at least three (3) sludge ages. The HRT was maintain by increasing the number of cycles per day from 6 to 9. The total aerobic time of the nitrifying biofilm was increased by increasing the carrier volume from 50% to 66% using carriers from N2 Stage whilst its carrier volume was reduced from 33% to 25%, i.e. same total volume of carriers.

Details for Site #2
Phase I—To compare nitrogen removal performance and capacity between the Two-stage Two-sludge SBR3 process and the Conventional SBR (i.e. Two-stage Single-sludge) with conventional nitrification-denitrification operation. The SBR reactors were fine-tuned and stabilized at 26° C. to 30° C. for at least two (2) sludge ages ($\geq 30$ days) such that good nitrification-denitrification was achieved.
Phase II—To study the potential minimum operation sludge age and MLSS concentration, where the Two-Stage Two-Sludge SBR3 and the Conventional SBR were operated at a sludge age close to or below the identified critical sludge age (~5 days) with all other operating parameters constant for at least three 3 sludge ages ($\geq 15$ days). Nitrification performance was evaluated for both the SBR systems until the conventional SBR achieved <30% nitrification, as compared to the SBR.

Results
The 24-hour average influent and effluent characteristics for a 5-day period during each phase of the stabilized SBR3 at Sites#1 & 2 are shown in FIGS. 8C–8H. The average influent characteristics of STW Site#1 are shown in FIG. 8C. The average effluent characteristics of SBR3 at Site#1 are shown in FIG. 8D. The average effluent characteristics of conventional SBR at Site#1 are shown in FIG. 8E. The average influent characteristics of STW Site#2 are shown in FIG. 8F. The average effluent characteristics of SBR3 at Site#2 are shown in FIG. 8G. The average effluent characteristics of conventional SBR at Site#2 are shown in FIG. 8H.

Figure 8I:
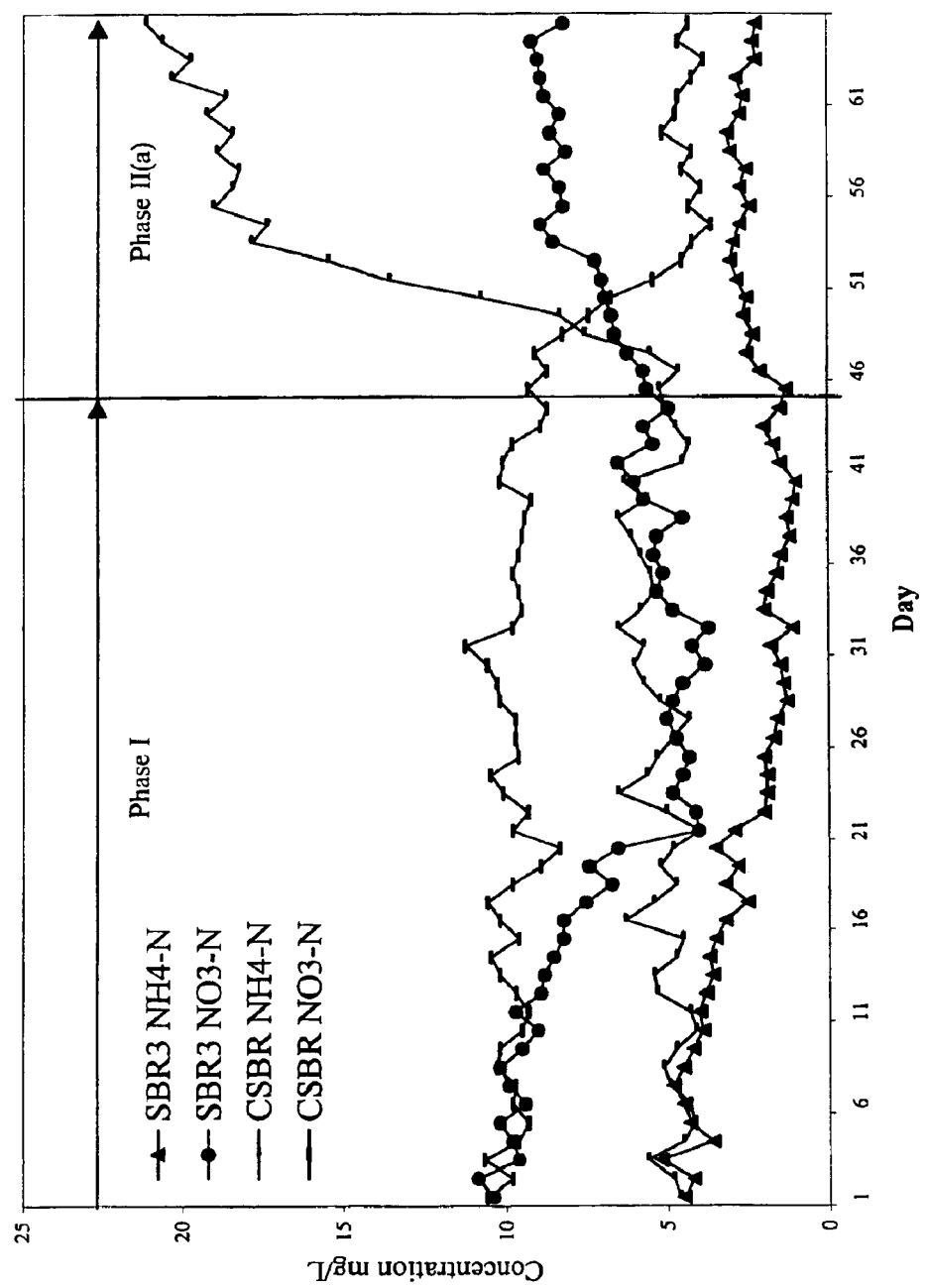
FIG. 8I is a diagram to show the data of the daily effluent nitrogen concentration obtained from operating the SBR3 at STW site#1 for 66 days.
Figure 8J:
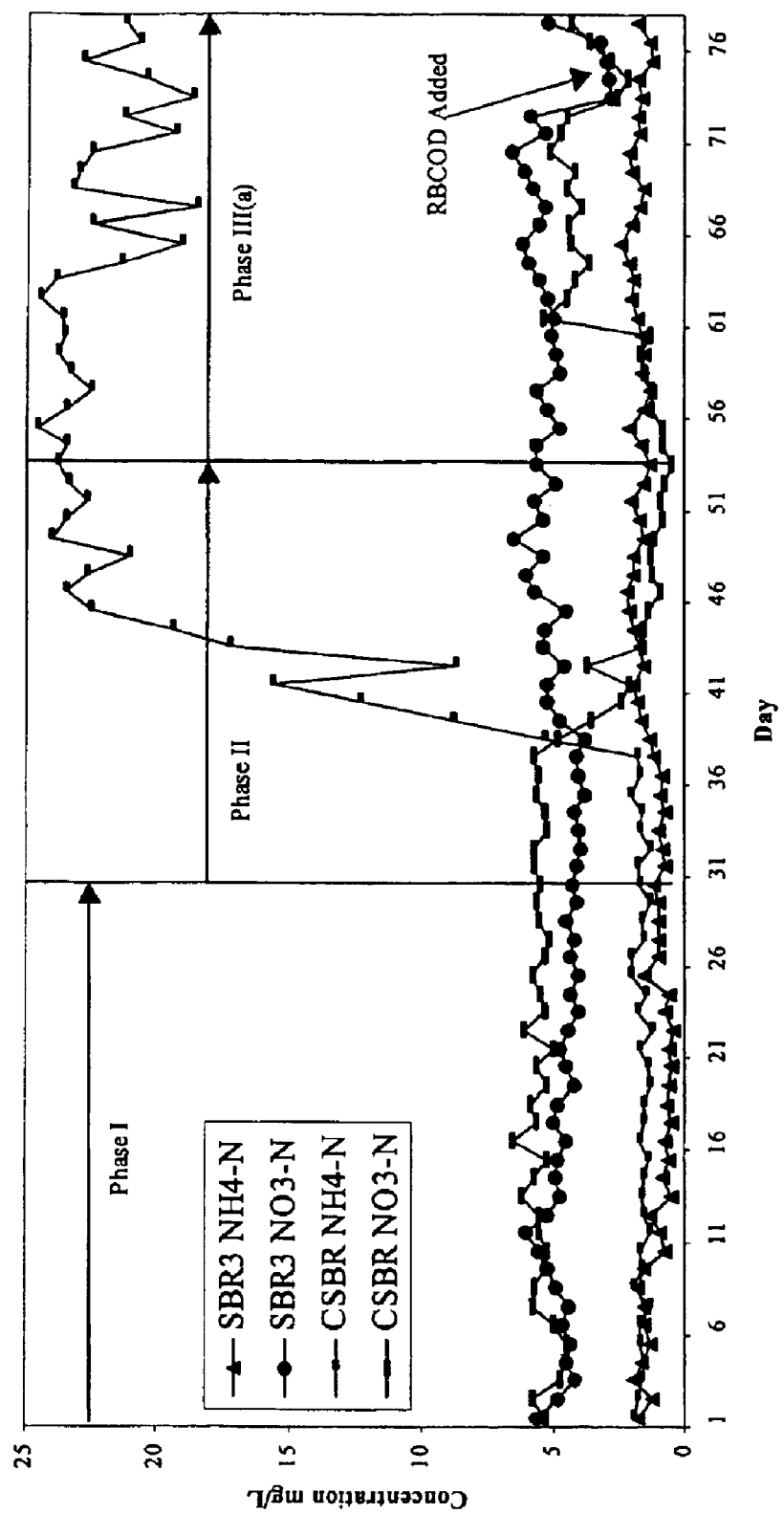
FIG. 8J is a diagram to show the data of the daily effluent nitrogen concentration obtained from operating the SBR3 at STW site#2 for 78 days.
Figure 8K:
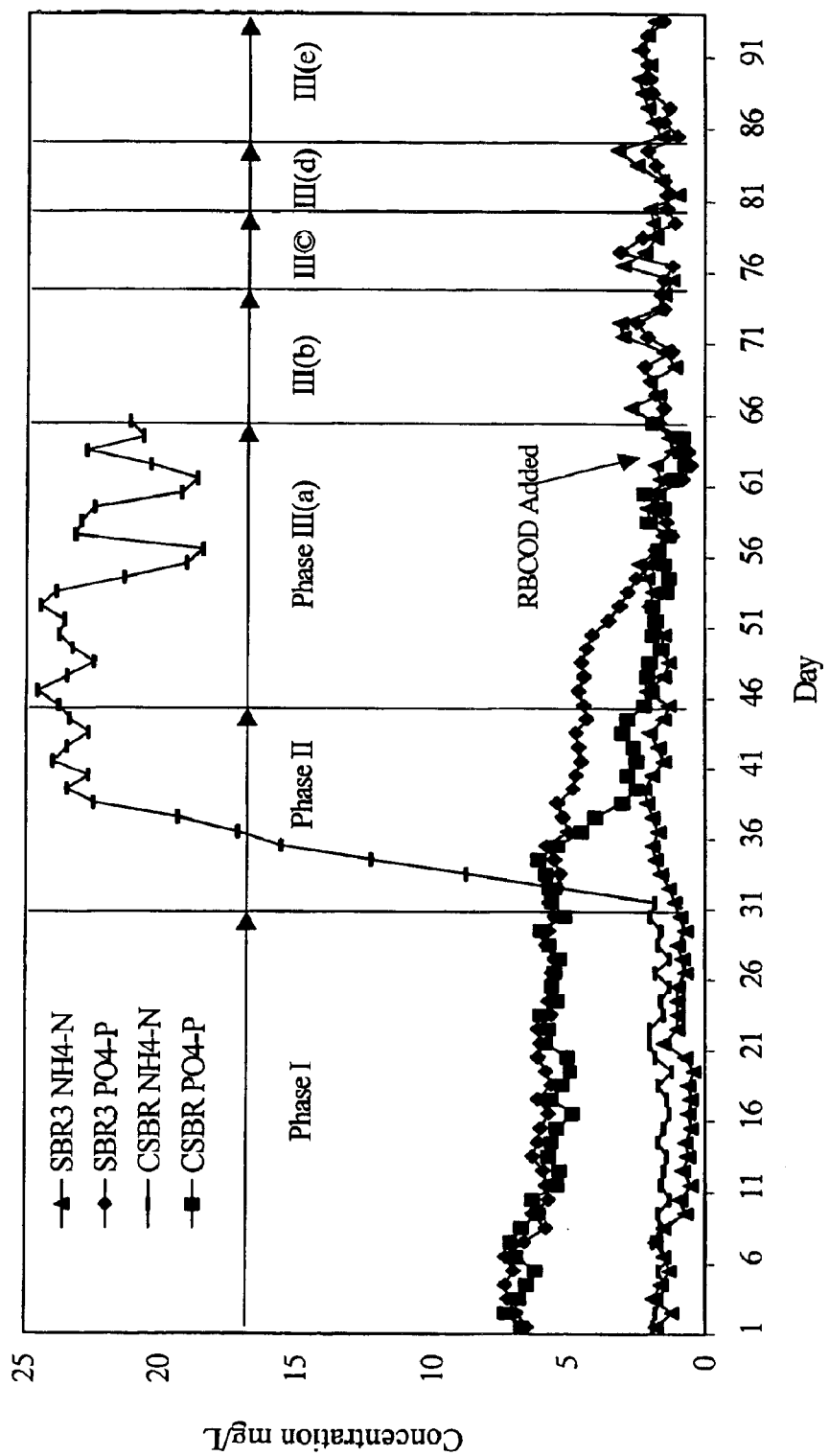
FIG. 8K is a diagram to show the data of the daily effluent nitrogen and phosphorus concentrations obtained from operating the SBR3 at STW site#2 for 93 days.

The daily effluent nitrogen concentration of the SBR3 operated at the STW Site#1 for 65 days is shown in FIG. 8I. The daily effluent nitrogen concentration of the SBR3 operated at STW Site#2 for 53 days is shown in FIG. 8J. The daily effluent ammonia and phosphate concentrations of the SBR3 operated at STW Site#2 for a 45 days are shown in FIG. 8K. For any process operation disruption of the SBRs, only effluent samples from properly operated cycles were tested and documented.

SBR3 and Conventional SBR—Nitrification-Denitrification Performance
During Phase I of each STW Site, both SBRs at Site#2 and the SBR3 at Site#1 after biomass stabilization were able to consistently achieve complete nitrification (effluent $NH_4$—N<1–2 mg/L and ~80% removal of nitrogen (effluent $NO_3$—N<10 mg/L). The conventional SBR at Site#1 had slightly higher effluent ammonia of ~4 mg/L. at both sites. The effluent soluble COD (SCOD) concentrations of STW Site#1 were always higher probably resulting from the large industrial wastewater contributions. This also led to higher effluent $NH_4$—N and $NO_3$—N concentrations than those of Site#2, despite having similar influent TCOD: TKN ratios of ~10 to 11. In addition, the overall higher total biomass contents with the biofilm carriers allowed the SBR3 of both Sites having noticeable better nitrification-denitrification performance. It also appeared that the conventional SBR of Site#1 was operated at near their maximum capacity because the effluent $NH_4$—N concentration was frequently higher than the target 2 mg/L level.

The nitrifiers maximum specific growth rates is the key characteristics of sewage determining the hydraulic and organic capacity requirements of the conventional SBR process, i.e. the size of the SBR basin. These values of Sites # 1 & 2 were determined to be 0.2 and 0.3/Day, respectively, at the end of this Phase. The significantly lower nitrifiers maximum specific growth rate level of Site#1 further indicated the impact of the industrial wastewater discharges. However, the apparent maximum specific growth rate of nitrifiers of the SBR3 were significantly (>30%) higher than that of the conventional SBRs.

Low buffering capacity of the sewage was also noticed. At the end of FILL-AERATE sequence, aerobic reactor pH levels were frequently lower than 7, while values as low as 6.5 was also recorded on a number of occasions. Low operating pH of 6.5–7 would lead in up to 50% reduction of the maximum nitrification rate as compared to that at the most optimal pH range of 7.8–8.2. Highly variable chloride concentrations ranging from 3,500 to 7,000 mg/L were also known to adversely affect nitrification rate. However, these adverse effects were largely recovered with incorporation of biofilm in the SBR3 activated sludge technology.

During Phase II(a) and Phase II of the respective Sites, reducing the operating sludge age to less than 10% of the critical sludge age (~5 days) demonstrated clearly the better advantages of the SBR3s of site #1 than that of the conventional SBRs of site #2. The conventional SBR effluent $NH_4$—N levels increased sharply at the end of this Phase (FIGS. 8I & 8J), as compared to those levels of the SBR3s showed a slight increase (~1–2 mg $NH_4$—N/L) but with more fluctuations. The high MLSS concentrations of ~3,500 mg/L of the SBRs, the typical maximum SBR operating level, were also reduced dramatically to ~1,500 to 1,700 mg/L. This greatly assisted the SETTLE and DECANT sequences efficiency. With the growth pressure created by the Bio-selector, the sludge settleability improved (SVI values were mostly less than 125 mL/g). Higher effluent TSS concentration, particularly during Phase II, was observed for Site#2 with significantly higher total dissolved solids concentration.

For Site#1 only, a number of different operating modes and configurations, as detailed in Table 2, were also practiced for nitrification-denitrification performance evaluation. These included intermittent vs. continuous feed, constant-vs. variable-volume operation of the Anoxic stage(s) and continuous-Anoxic vs. Alternating Anoxic/Aerobic configurations. These were not repeated in Site#2. However, different operating modes and configurations for nitrogen and phosphorus removal were tested. This was because the sewage of Site#1 did not show any favorable characteristics such as high level of readily biodegradable COD and good denitrification (effluent $NO_3$—N<5 mg/L).

As indicated in FIGS. 8D and 8E, there were no significant changes in nitrogen removal performance for 15 days of each of the different operating modes and configurations tested.

Figure 9A:
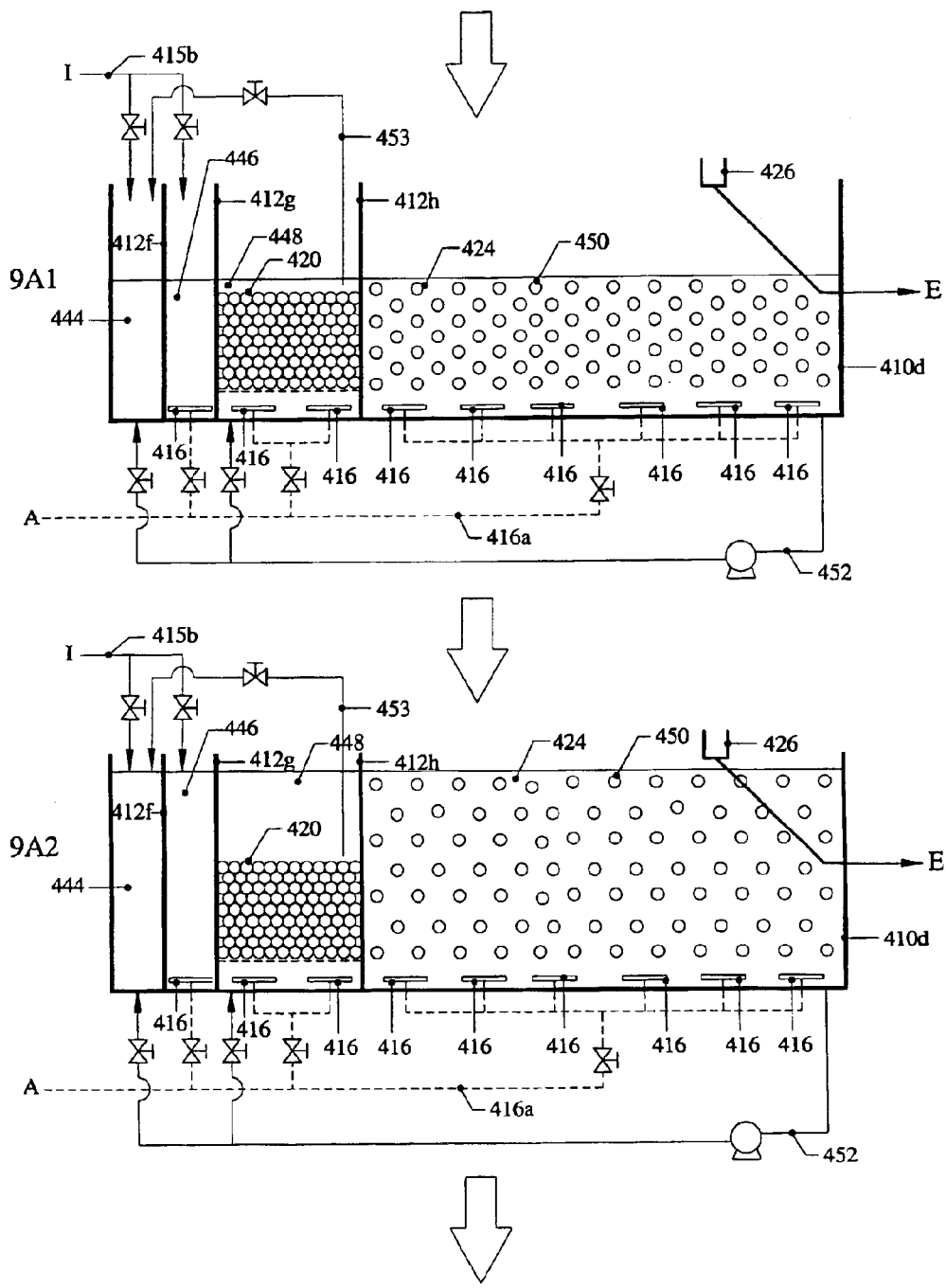
FIGS. 9A & 9B are drawings to illustrate the SBR cycle sequence of a three-stage three-sludge anaerobic-anoxic-aerobic SBR3 process using the system shown in FIG. 4.
Figure 9B:
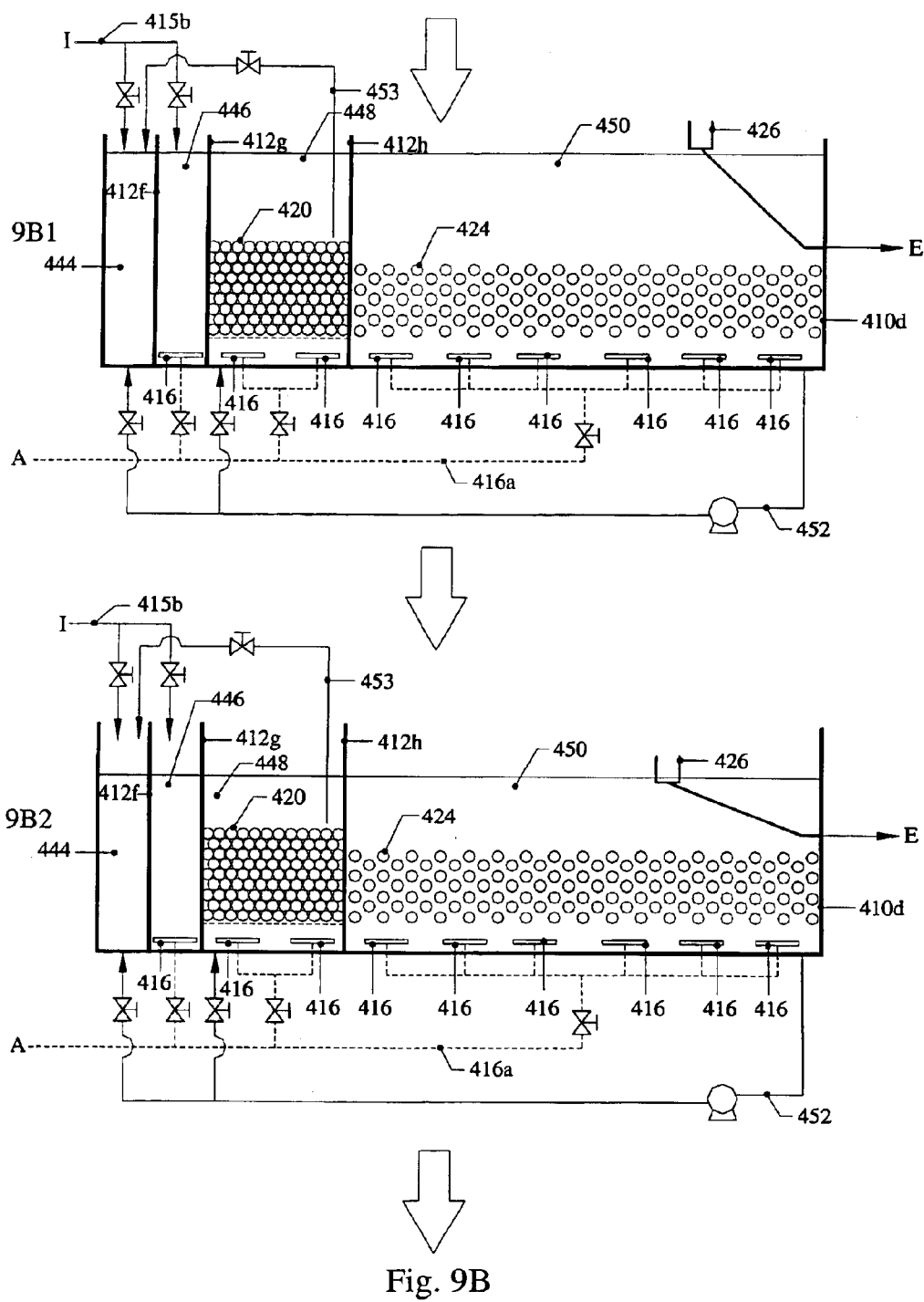

Case 3 Three-Stage and Three-Sludge Anaerobic-Anoxic-Aerobic Process for Organics-suspended Solids-phosphorus and Nitrogen Removal One of the possible three-stage three-sludge SBR3 system configurations is illustrated in FIG. 4. This configuration consists of a P Stage, which is sub-divided into two sub-tanks 444 and 446. The P Sludge consists of the suspended mixed liquor biomass, which contains enhanced biological phosphorus (bio-P) removal microorganisms. The bio-P microorganisms are developed due to their free movement through the bioreactor and mixed liquor recycle and thus, exposure to cyclic anaerobic-aerobic conditions made possible by the incorporation of the P Stage anaerobic condition. The DN Stage and DN Sludge, and N Stage and N Sludge are similar to Case 2. A variable-volume decanting device is provided in the N Stage, which is operated in SBR mode, as illustrated in FIGS. 9A and 9B. The cycle starts from step 9A1, going through steps 9A2, 9B1, and 9B2, and goes back to step 9A1. In this process, the three tanks are used for:
(1) The first stage P:P1 (unaerated, as performed in the first tank 444) and P2 (unaerated and anerobic, as performed in the second tank 446)
(2) The second stage DN (as performed in the third tank 448)
(3) The third stage N (as performed in the fourth tank 450)

For the ease description of the bio-chemical processes, the following description contains reference only to the bio-chemical stage without further reference to the particular tanks as shown in FIG. 4, 9A or 9B. It is understood that these processes are performed in the respective tanks.

The P and DN stages are also variable-volume in this example, but either may also be operated in constant-volume mode.

The P Stage receives influent wastewater which may be split between the sub-tanks 444 and 446 and the sub-tank 444 may also receive return mixed liquor from the end of the DN Stage and/or the end of the N Stage. This first P Stage sub-tank 444 is un-aerated and conditions are aerobic, anoxic or anaerobic, depending on the level of the oxygen species present mainly from the N Stage recycle. Anoxic conditions are due to the nitrate in the recycled nitrified mixed liquor. The amount of mixed liquor recycle to the P Stage will be controlled during the aeration sequence so that the dissolved oxygen and nitrate oxygen recycle will not adversely affect the bio-P removal performance. Settled sludge from the N Stage will be recycled to the P Stage to enhance bio-P removal, if required. If aeration is used in the P Stage, aerobic conditions would be promoted. If enhancement of P removal is desired, the recycle of mixed liquor from the end of the DN Stage may be utilized since this would promote anaerobic conditions in the P Stage. The second P Stage sub-tank 446 is unaerated and conditions are mainly anaerobic.

The P Stage is dominated by fast growing bacteria, which are capable of degrading readily biodegradable organics (RBCOD), and also the bio-P microorganisms which release P in anaerobic conditions (and uptake P in anoxic or aerobic conditions). Whereas most of the P uptake occurs in the DN and N stages, it also can occur in the P Stage. In the P Stage, mixing may or may not be provided.

During settle and decant sequences of the N Stage, the settled biomass from the P-rich MLSS can be removed (e.g. wasted) thereby removing the P.

The DN and N Stages will be operated similar to those of Case 2, except that some of the RBCOD from the influent has already been absorbed for bio-P removal.

The duration of the three-stage three-sludge SBR3 system operating cycle can be less than two hours to up to twenty-four hours. The total HRT can be shorter than six hours. The P and/or DN stages may employ constant volume operation while the N Stage will be operated with variable volume mode. A bio-selector as part of the P Stage will optionally be incorporated to control biological foaming and bulking, particularly if the MLSS is high. Sludge wasting is either separately for the DN or N Stages or together from the N Stage during the settling sequence.

Case 3 Experimental Data

Two fully automatic PLC controlled SBR pilot-scale reactors were built including an on-line wastewater sampling, monitoring and control system. The SBR3 included biofilm carriers with configuration as shown in FIG. 5 and the "conventional SBR" was identical to the SBR3 except that it had no biofilm carriers and was used as a control.

A Three-Stage Three-Sludge SBR3 was tested: same as the Two-Stage Two-Sludge SBR3 except that a third stage (P Stage) was added for phosphorus removal, with the third P Sludge consisting of the activated sludge, which is suspended and flowing through all the tanks (main role: phosphorus removal by cyclic anaerobic phosphorus release and aerobic or anoxic uptake).

Configuration and Operation for Initial Phase of Testing

The initial configuration and operation of the SBR3 for nitrogen and phosphorus removal is shown in FIG. 5 and Table 3, respectively.

TABLE 3

Initial SBR3 Pilot Plant Configuration for Nitrogen & Phosphorus Removal

| Main Function | Configuration & Operation | | Carrier Volume % |
|---|---|---|---|
| Phosphorus Release | P1 Stage | 25 L unaerated, variable vol. | None |
| | P2 Stage | 25 L anaerobic, variable vol. | None |
| Denitrification | DN1 Stage | 75 L anoxic, variable vol. | 50% |
| | DN2 Stage | 75 L anoxic, variable vol. | 50% |
| Nitrification | N1 Stage | 200 L SBR cycle | 50% |
| | N2 Stage | 400 L SBR cycle | 33% |
| N/A | Total Reactor Volume | 800 L | N/A |
| | Total HRT | 10 Hrs | |
| | Mixed liquor Recycle ratio | 20% N2 to P1 & 80% N2 to DN1 (160 L/Hr) | |
| | SBR cycle: | | |
| | FILL Volume | 320 L/cycle | |
| | FILL Rate | 160 L/Hr | |
| | Cycle Time | 4 Hrs | |
| | FILL-AERATE | 2 Hrs | |
| | SETTLE/NON-AERATE | 1 Hr | |
| | DECANT/NON-AERATE | 1 Hr | |

Note:
No carriers in Conventional SBR pilot plant (otherwise identical to SBR3)

The two pilot-scale SBR systems were set up and operated in parallel at a municipal sewage treatment works in Hong Kong (Site #2) with the initial Phase III conditions shown in Table 3. Phase III testing was continued with changes in key operational parameters, and with one change in the location of the mixed liquor return, to observe the combined nitrogen and phosphorus removal capability.

Operation and Configuration Changes for Trial Testing

The changes are listed in Table 4 for the testing at Site #2.

TABLE 4

Operation and Configuration Changes for Case 3 Demonstration Site #2

| SBR Modifications - Nitrogen & Phosphorus Removal | Sludge Age | Days | Date |
|---|---|---|---|
| Maintain sludge age less than critical sludge age of nitrifiers (same as in Phase II). | 5 | 20 | 5/1/03 to 25/1/03 |
| Re-route the mixed liquor recycle of the P1 Stage such that it is from DN2 Stage rather than N2 Stage. Conventional SBR not changed | 5 | 10 | 25/1/03 to 4/2/03 |
| DN1 & DN2: Add intermittent aeration (i.e. alternating anoxic/aerobic). Change the P1 Stage mixed liquor recycle back to (a), i.e. N2 Stage. Conventional SBR not changed | 5 | 5 | 4/2/03 to 8/2/03 |

TABLE 4-continued

Operation and Configuration Changes for Case 3 Demonstration Site #2

| SBR Modifications - Nitrogen & Phosphorus Removal | Sludge Age | Days | Date |
|---|---|---|---|
| P1 & P2 Stage: Change to constant volume operation. Decant volume increased from 40% to 43%. DN1 & DN2: no aeration | 5 | 5 | 8/2/2003 to 16/2/03 |
| All tanks: Change to continuous feed P1 & P2 Stage: variable volume operation, as in (a) | 5 | 8 | 16/2/03 to 24/2/03 |
| | Total | 48 | |

Details for Site #2
Phase III—The Phase III study consisted of:
(a) To compare nitrification, dentrification, and phosphorus remove performance and capacity between the Three-Stage Three-Sludge SBR3 and the Conventional SBR (i.e. Tree-Stage Sludge). Incoming sewage was split between the P1 Stage (20%) and the P2 Stage (80%). Testing lasted for at least three (3) sludge ages ($\geq 15$ days).
(b) At the end of (a), the mixed liquor recycle to the P1 Stage was change from end of N2 Stage to end of DN2 Stage to investigate the effect on phosphorus removal. Stages P1 and DN1 received 20% and 80% respectively of the total Stage N2 recycled mixed liquor. This would promote anaerobic conditions, and thus phosphorus removal, in P1 Stage in the case that $NO_3$—N was not sufficiently depleted in P1 with the N2 Stage mixed liquor. After at least two (2) sludge ages, the SBRs were changed back to (a).
(c) At the end of (b), intermittent aeration of DN1 & DN2 Stages was tested at the end of the FILL-AERATE sequence. This is to provide intermittent mixing of the settled carriers, i.e. temporary suspension only when the aeration is ON, in order to promote better and more uniform growth of the biofilm and also to minimize clogging. The reaction conditions, however, would change from continuous anoxic to alternation anoxic/aerobic. Duration was short and after feed of the sewage to prevent unnecessary aerobic losses of the organic carbon. The denitrification and phosphorus removal performance was evaluated. After on (1) sludge age, i.e. longer than three (3) HRTs, the intermittent aeration was stopped, i.e. back to (a).
(d) At the end of (c), the variable-volume operation of the P1 & P2 Stages was change to constant volume operation, and the performance was evaluated. The HRT was maintained by increasing the decant volume from 40% to 43%. After one (1) sludge age, the operation was changed back to variable-volume, i.e. back to (a).
(e) At the end of (d), the intermittent feed was changed to continuous feed for one and one-half (1½) sludge ages.

Results

The 24-hour average influent and effluent characteristics for a 5-day period during Phase III at Site#2 are shown in FIGS. 8F, 8G, and 8H. The average influent characteristics of STW at site#2 are shown in FIG. 8F. The average effluent characteristics of SBR3 are shown in FIG. 8G. The average effluent characteristics of conventional SBR are shown in FIG. 8H.

The daily effluent nitrogen concentration of the SBR3 operated at the STW for 25 days is shown in FIG. 8J. The daily effluent ammonia and phosphate concentrations of the SBR3 operated at STW for 48 days are shown in FIG. 8K. For any process operation disruption of the SBRs, only effluent samples from properly operated cycles were tested and documented.

SBR3 and Conventional SBR—Nitrification-Denitrification and Phosphorus Removal Performance At the end of Phase II at Site#2, it was observed that the effluent phosphate levels were gradually decreasing when the conventional SBR was being operated with highly restricted nitrification. It was then decided to test the SBR3 nitrogen together with phosphorus removal using different operating modes and configurations (Table 4).

The configuration modifications of SBR3 for phosphorus removal included incorporation of an anaerobic stage (an additional Stage) and an extra mixed liquor recycle from the end of the anoxic stage to the first anaerobic stage. Phosphorus removal was quickly developed within two operating sludge ages (~2*5 days). However, the effluent phosphate levels of less than 1 mg/L could not be achieved unless there was addition of external readily biodegradable COD of up to 50 mg/L using acetate (FIG. 8K). This clearly showed that the content of readily biodegradable COD in the sewage was not sufficient, as expected from high $SO_4^{2-}$ content from the seawater contribution.

Changing the mixed liquor recycle to the P1 sub-tank from the previous location at the end of the aerobic stage to the end of the anoxic stage did not reveal any improvement. Other operating modes with intermittent vs. continuous feed, constant- vs. variable-volume operation of the P Stage and intermittent aeration of the anoxic stage also did not demonstrate any obvious advantage or disadvantage.

As mentioned above, means for stage generation may be any devices or built-in or add-on design of the system that allows the desired conditions to be attained for the appropriate biochemical parameters or bioreactor functions. Besides devices such as mixer, aerator, heater, cooler, trickier, or pump, other conditions achievable by design include, for example, the relative positioning of the two or more tanks to make use of gravity to allow fluid to flow from one tank to the next via one or more flow channels, etc. The tanks can also be separated vertically. In another embodiment, the first and second tanks are disposed some vertical distance from each other, and the means for generation of the stages consists of channels for interconnecting fluid flow between the first and second tanks. Wastewater can also be any type, including high levels of organic compounds and does not exclude 100% organics. Furthermore, first or second sludge refers to biomass with emphasis on its uniqueness but is not meant to exclude other biological activities besides the one specified in the text. The carriers on which the sludges grow can be mobile, remain settled at the bottom of the tank when no external mixing is provided (i.e. intermittently suspended), or can be completely fixed depending on the requirement of the system. The flow channels may be lined, for example, with gravel arranged in such a way as to generate splashes or droplets to create a large surface area for the absorption of oxygen into the fluid before influence into the second tank. The second tank may then be used for aerobic removal of nitrogen and/or phosphorus according to the user's requirements. Other means for stage generation, such as heater or trickier, may also be used in combination therewith for further control of stage conditions. Moreover, the arrangement of stages in the text does not represent sequential order, the chronological order is used to distinguish between one stage to another and for the ease of understanding. The means of influence and effluence is not restricted to the first tank and may be in the first, second or third tank depending on the requirements.

Figure 10A:
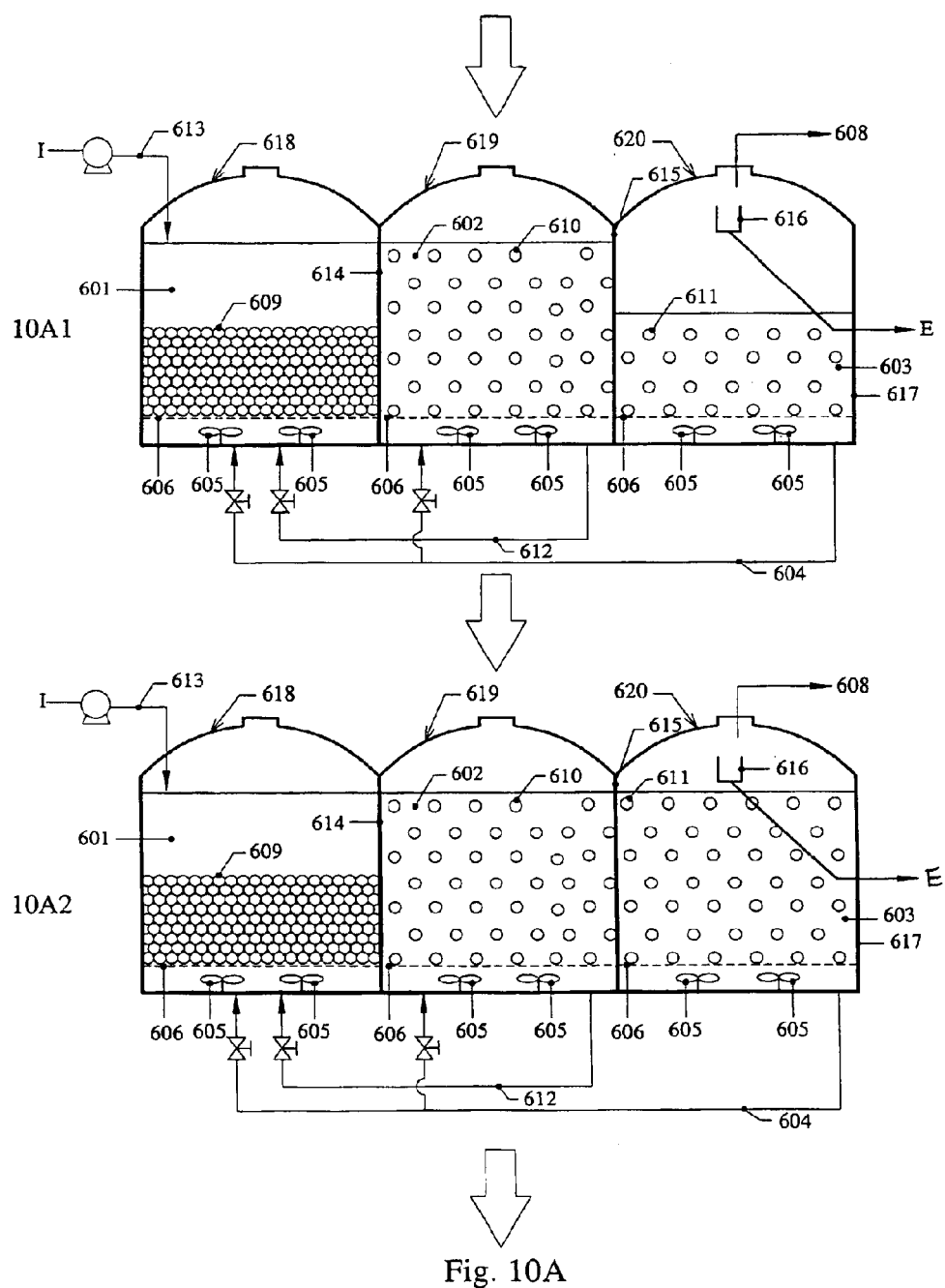
FIGS. 10A & 10B are drawings to illustrate the SBR cycle sequence of a three-stage three-sludge anaerobic-anaerobic-anaerobic SBR3 process using the system shown in FIG. 6.
Figure 10B:
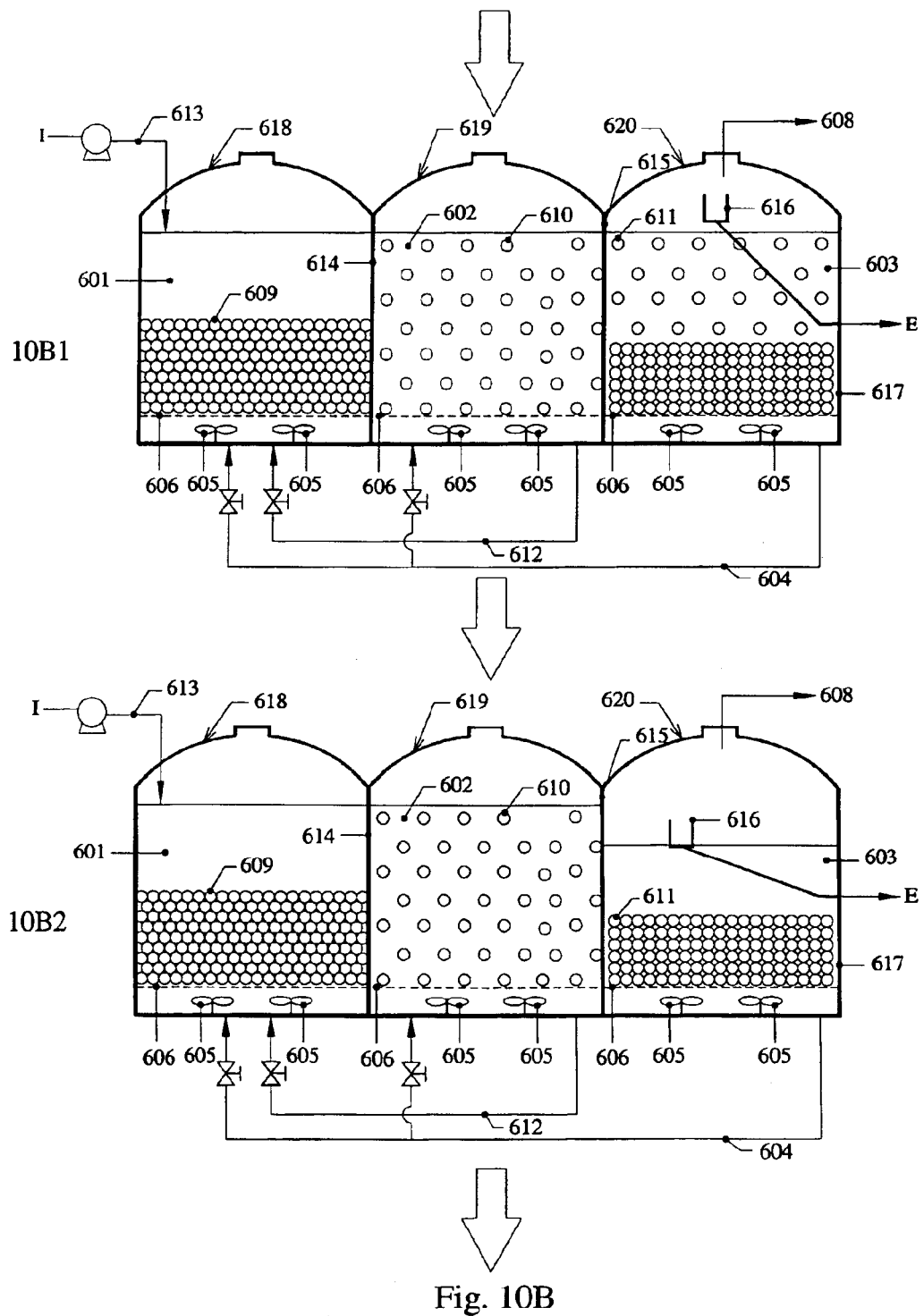

Case 4 Three-stage and Three-sludge Anaerobic-Anaerobic-Anaerobic Process for Organics-suspended Solids One of the possible three-stage three-sludge SBR3 system configurations is illustrated in FIG. 6. The cycle sequence of the SBR3 process of case 4 is illustrated in FIGS. 10A and 10B. The cycle starts from step 10A1, going through steps 10A2, 10B1, and 10B2, and goes back to step 10A1. In this process, the enclosed three tanks are used for:

(1) The first stage HP (performed in the first tank 601);
(2) The second stage AC (performed in the second tank 602);
(3) The third stage MP (performed in the third tank 603).

For the ease of description of the bio-chemical processes, the following description contains reference only to the biochemical stage without further reference to the particular tanks as shown in FIG. 6, 10A or 10B. It is understood that these processes are performed in the respective tanks.

This configuration consists of a HP Stage with HP Sludge consisting of the biofilm on the mobile carriers, an AC Stage with AC Sludge consisting of the biofilm on the fixed or mobile carriers and a MP stage with MP Sludge consisting of the biofilm on the fixed or mobile carriers. A variable-volume emptying device is provided in the MP Stage, which is operated in SBR mode, as illustrated in FIG. 10. Note that in this case, the HP and AC Stages have constant volume but either may also be designed and operated in variable-volume mode.

The HP Stage receives influent wastewater and may also receive return mixed liquor (ML) from the AC and/or MP Stages for better control of reaction conditions, either continuously or intermittently. The HP Stage is operated, particularly for industrial wastewaters containing high solids concentration, for hydrolysis of particulate organic matter by extracellular enzymes to soluble organic molecules such as sugar, fatty acids and amino acids. The HP Sludge is dominated by slow-growing bacteria, which are capable of hydrolysis of particulate organic matter to more readily biodegradable organics. Together with high operating temperature in the thermophilic range (50 to 60° C.), the higher concentration of HP sludge can speed up the hydrolysis process from 10–20 days to 2–5 days. The carriers together with the particulate organics are, mobile carriers that remain near the bottom of the tank because they are slightly heavier than water, of up to 70% of the tank volume are provided for biomass attachment. The mobile carriers may only be temporarily suspended by intermittent mixing to allow the soluble organics to be release to the bulk liquor but at the same time minimize contact with the soluble organics.

Mixed liquor in the HP Stage is in intermittent communication, i.e. during the settle and decant sequences, with mixed liquor in the AC Stage by any means of flow interconnection, e.g. overflow, channels, pumping, etc. A mesh is placed at each opening to prevent any biofilm carriers from going from one stage to the other. The AC Stage contains suspended carriers of up to 70% of the volume. The carriers may be intermittently or continuously mixed, depending on conditions in the tank. This stage, which may also receive return mixed liquor from the MP Stage for better control of reaction conditions, either continuously or intermittently, acts as an acid-forming/acidogenic step to convert bytyric and propionic acids to acetic acid. Thus, the biofilm AC Sludge will have a unique composition. Carriers of the AC Stage may also minimize the solids-liquid separation requirement such that a settle reaction sequence is not necessary and so allows the mixed liquor in the AC Stage to be in continuous communication with mixed liquor in the MP Stage by any means of flow interconnection, e.g. overflow, underflow, channels, pumping, etc. A mesh is placed at each opening to prevent any biofilm carriers from going from one stage to the other.

Similarly, the MP Stage contains suspended carriers of up to 70% of the tank volume depending on the decant percentage. The carriers may be intermittently or continuously mixed, depending on conditions in the tank. This stage mainly acts as a methane producing step. Mixing is provided by both mechanical mixing and biogas production in the mixed liquor. The biogas is collected for further handling. The MP Stage may also perform as a secondary clarifier for solids-liquid separation (SBR operation mode). When the mechanical mixing is OFF during the settle sequence, the carriers and activated sludge settle to the bottom. Contact between the acetic acid in the bulk liquid with the MP sludge is minimized. The resultant reduced biogas production allows better settling of carriers and suspended sludge before emptying of the effluent.

The duration of the SBR3 operating cycle can be less than two hours to up to twenty-four hours. The total HRT can be shorter than six hours. The HP and AC Stages can employ either constant or variable volume operation while the MP Stage will be operated with variable volume mode. Sludge wasting is either separately for each stage or together from the MP Stage during the settling sequence.

While the present invention has been described in detail using the case studies and embodiments shown above, they are for illustration only, and are not meant to limit the scope of the invention, which is defined by the claims appended herein. It is clear from the aforementioned examples that enormous numbers of variations and combinations are possible based on the teaching provided herein. For example, the carriers in the embodiments shown are mobile carriers. However, it is clear that the carriers may also be fixed carriers, but with other means for stage generation being used to create a suitable environment for growth of the desired sludge for the desired bioreaction stage. The type of carriers and amount used are variable. Mixing is provided by various means, either continuously or intermittently, to create the desired conditions for growth of a desired sludge to perform the desired bioreaction stage. For anaerobic conditions, the mixers, even if they are provided in the tank, may be completely inactivated such that the carriers are completely settled at the bottom of the tank to minimize oxygen that can reach thereto. While one tank usually involves only one stage in the illustrations, it is noted that there may be more than one stage within a tank due to differences of conditions. For the stages where variable volume mode is employed, constant volume mode can also be employed, and vice versa. Although the description and the claims recite biomass that are grown on carriers for the various bioreaction stages, this is not intended to preclude the presence of activated sludge that is found in suspension. It is clear that such activated sludge also contributes to the bioreaction of the various stages as described in the aforementioned examples. Furthermore, while the range of operating temperatures is indicated in some of the illustrations, it is clear that the temperature ranges are highly dependant on other operation conditions and may be determined by one of ordinary skill in the art without undue experimentation based on the teachings provided herein.

Several types of means for stage generation such as the mixer, aerator, gas generator, heater and cooler pump are mentioned in above illustrations and in the claims, but it is clear that such examples are for illustration only and that other such means would also fall within the scope of the claims, including the use of architectural arrangements to take advantage of physical forces such as gravity.

What is claimed is:

1. A system for treating wastewater comprising at least one reactor comprising
    a) at least a first tank interconnected to a second tank for retaining wastewater therein and discharging treated wastewater therefrom, said tanks provided with means for influence and means for effluence to allow fluid level within at least one tank to be fillable to a filled level and emptied to a lower discharged level;
    b) independently controllable first and second means for stage generation provided for each said first and second tank respectively;
    c) carriers for growth of biomass provided in each of said tanks; and
    d) a controller for controlling the operation of said first means for stage generation to create a first condition for the selective growth of a first biomass on said carriers within said first tank to form a first sludge, said first sludge adapted for performing a first bioreaction stage in said wastewater; and said controller further adapted for controlling the operation of said second means for stage generation to create a second condition for the selective growth of a second biomass on said carriers within said second tank to form a second sludge, said second sludge adapted for performing a second bioreaction stage in said wastewater.

2. The system according to claim 1 wherein said first and second means for stage generation comprise at least a mixer, aerator, heater, cooler, pump or a combination thereof.

3. The system according to claim 1 wherein said first and second tanks are disposed some vertical distance from each other, and said means for stage generation comprising interconnections for fluid flow between said first and second tanks.

4. The system according to claim 1 wherein said first tank and said second tank are interconnected via openings in a separation wall therebetween.

5. The system according to claim 1 wherein said reactor further comprises a third tank and recycling means for connecting said first and second tank thereto, said recycling means adapted for transferring mixed liquor from said first or second tank into said third tank for generation of a third bioreaction stage.

6. The system according to claim 5 wherein said third sludge is adapted for performing removal of carbon, solids, nitrogen or phosphorus.

7. The system according to claim 5 wherein said third condition is selected from a group consisting of anaerobic condition, aerobic condition and anoxic condition.

8. The system according to claim 5 wherein said third tank is further provided with a third means for stage generation; said controller further adapted to control said third means for stage generation such that a user may create a third condition for the selective growth of a third biomass to form a third sludge.

9. The system according to claim 8 wherein said third means for stage generation comprises at least a mixer, aerator, heater, cooler, pump or a combination thereof.

10. The system according to claim 5 further comprising a fourth tank provided with recirculating means for receiving mixed liquor from said reactor for further generation of a fourth bioreaction stage.

11. The system according to claim 10 wherein said fourth sludge is adapted for performing removal of carbon, solids, nitrogen or phosphorus.

12. The system according to claim 10 wherein said fourth condition is selected from a group consisting of anaerobic condition, aerobic condition and anoxic condition.

13. The system according to claim 10 wherein said fourth tank is further provided with a fourth means for stage generation; said controller further adapted to control said fourth means for stage generation such that a user may create a fourth condition for the selective growth of a fourth biomass to form a fourth sludge.

14. The system according to claim 13 wherein said fourth means for stage generation comprises at least a mixer, aerator, heater, cooler, pump or a combination thereof.

15. The system according to claim 1 wherein said reactor further comprises a bioselector connected to the first or second tank for selection of the desired micro-organisms.

16. The system according to claim 1 wherein said first sludge is adapted for performing removal of carbon, solids, nitrogen or phosphorus.

17. The system according to claim 1 wherein said second sludge is adapted for performing removal of carbon, solids, nitrogen or phosphorus.

18. The system according to claim 1 wherein said first condition is selected from a group consisting of anaerobic condition, aerobic condition and anoxic condition.

19. The system according to claim 1 wherein said second condition is selected from a group consisting of anaerobic condition, aerobic condition and anoxic condition.

20. The system according to claim 1 wherein a partition is further provided to divide said first tank into two hydraulically connected sub-tanks.

21. A method of treating wastewater using at least one reactor containing at least a first tank and a second tank, said tanks provided with carriers for growth of biomass thereon, said method comprising
    a) dispensing wastewater into said first and second tanks;
    b) controlling the operating conditions of the tanks separately such that a first condition is created for growth of a first biomass on said carriers as a first sludge suitable for a first bioreaction stage within the first tank, and a second condition is created for growth of a second biomass on said carriers as a second sludge suitable for a second bioreaction stage within the second tank; and
    c) emptying said wastewater in at least one tank after treatment therein.

22. The method according to claim 21 wherein said first sludge is adapted for performing removal of carbon, solids, nitrogen or phosphorus.

23. The method according to claim 21 wherein said second sludge is adapted for performing removal of carbon, solids, nitrogen or phosphorus.

24. The method according to claim 21 wherein said first condition is selected from a group consisting of anaerobic condition, aerobic condition and anoxic condition.

25. The method according to claim 21 wherein said second condition is selected from a group consisting of anaerobic condition, aerobic condition and anoxic condition.

26. The method according to claim 21 wherein said first sludge and second sludge attached on said carriers are denser than the wastewater used for treatment thereof; and said first and second conditions are produced by intermittent aeration of said carriers in said first and second tanks.

27. The method according to claim 21 wherein said reactor further comprising a third tank, and said method further comprises transferring mixed liquor from said first or second tank into said third tank for development of a third sludge for a third bioreaction stage.

28. The method according to claim 27 wherein said third sludge comprises an activated sludge suspension, said method further comprises the step of stimulating said third sludge to remove phosphorus from said wastewater through stressing the biomass of said third sludge by cycling said mixed liquor through the first and second bioreaction stages.

29. The method according to claim 21 wherein said a fourth tank is further provided, and said method further comprises transferring mixed liquor generated after bioreaction in said reactor into said fourth tank for development of a fourth sludge for a fourth bioreaction stage.

* * * * *